(12) United States Patent
Maeda et al.

(10) Patent No.: US 10,570,259 B2
(45) Date of Patent: Feb. 25, 2020

(54) COMPOSITION AND FORMED ARTICLE

(71) Applicant: JSR CORPORATION, Minato-ku (JP)

(72) Inventors: Shuugo Maeda, Minato-ku (JP); Masahiro Shibata, Minato-ku (JP); Akihiko Ookubo, Minato-ku (JP)

(73) Assignee: JSR CORPORATION, Minato-ku (JP)

( * ) Notice: Subject to any disclaimer, the term of this patent is extended or adjusted under 35 U.S.C. 154(b) by 52 days.

(21) Appl. No.: 15/756,653

(22) PCT Filed: Aug. 22, 2016

(86) PCT No.: PCT/JP2016/074368
§ 371 (c)(1),
(2) Date: Mar. 1, 2018

(87) PCT Pub. No.: WO2017/038528
PCT Pub. Date: Mar. 9, 2017

(65) Prior Publication Data
US 2018/0258239 A1 Sep. 13, 2018

(30) Foreign Application Priority Data

Sep. 2, 2015 (JP) ................... 2015-172649
Dec. 15, 2015 (JP) ................... 2015-243818

(51) Int. Cl.
*C08J 5/06* (2006.01)
*C08J 5/04* (2006.01)

(52) U.S. Cl.
CPC ............. *C08J 5/042* (2013.01); *C08J 5/06* (2013.01); *C08J 2300/22* (2013.01); *C08J 2347/00* (2013.01)

(58) Field of Classification Search
CPC . C08J 5/042; C08J 5/06; C08J 2300/22; C08J 2347/00; C08K 9/08; C08K 3/04; C08K 7/06; C08L 21/00; C08L 23/12; C08L 101/00; D06M 15/227
USPC ........................................................ 524/496
See application file for complete search history.

(56) References Cited

U.S. PATENT DOCUMENTS

| | | | |
|---|---|---|---|
| 4,501,857 A | 2/1985 | Kishimoto et al. | |
| 4,980,421 A | 12/1990 | Teramoto et al. | |
| 5,039,755 A | 8/1991 | Chamberlain et al. | |
| 5,270,274 A | 12/1993 | Hashiguchi et al. | |
| 5,596,041 A | 1/1997 | Hashiguchi et al. | |
| 6,291,596 B1 | 9/2001 | Sasanuma et al. | |
| 2003/0100683 A1 | 5/2003 | Toyoizumi et al. | |
| 2004/0254301 A1 | 12/2004 | Tsukimawashi et al. | |
| 2008/0295935 A1 | 12/2008 | Kobayashi et al. | |
| 2009/0143524 A1 | 6/2009 | Nakayama et al. | |
| 2011/0319519 A1 | 12/2011 | Sone et al. | |
| 2012/0208019 A1 | 8/2012 | Sugiura et al. | |
| 2014/0356612 A1 | 12/2014 | Sano et al. | |
| 2015/0045488 A1 | 2/2015 | Takenada et al. | |
| 2015/0183914 A1 | 7/2015 | Kawai et al. | |
| 2015/0376353 A1 | 12/2015 | Takebe et al. | |
| 2017/0211225 A1 | 7/2017 | Maeda et al. | |

FOREIGN PATENT DOCUMENTS

| | | |
|---|---|---|
| CN | 101305055 | 11/2008 |
| CN | 102597360 | 7/2012 |
| EP | 2 476 799 A1 | 7/2012 |
| EP | 3 170 869 A1 | 5/2017 |
| JP | 43-19960 B1 | 8/1968 |
| JP | 47-40473 B1 | 10/1972 |
| JP | 59-133203 A | 7/1984 |
| JP | 62-218403 A | 9/1987 |
| JP | 63-5401 A | 1/1988 |
| JP | 1-275605 A | 11/1989 |
| JP | 5-112657 A | 5/1993 |
| JP | 5-222115 A | 8/1993 |
| JP | 5-271325 A | 10/1993 |
| JP | 5-271326 A | 10/1993 |
| JP | 7-32465 A | 2/1995 |
| JP | 7-90017 A | 4/1995 |
| JP | 10-100174 A | 4/1998 |
| JP | 11-292924 A | 10/1999 |
| JP | 2000-37632 A | 2/2000 |
| JP | 3134504 B2 | 2/2001 |

(Continued)

OTHER PUBLICATIONS

U.S. Appl. No. 15/326,342, filed Jan. 13, 2017, US 2017/0211225 A1, Shuugo Maeda, et al.
Extended European Search Report dated Dec. 19, 2018 in Patent Application No. 16841560.2, 12 pages.
International Search Report dated Oct. 11, 2016 in PCT/JP2016/074368 (with English translation), 4 pages.
International Preliminary Report on Patentability and Written Opinion of the International Searching Authority dated Mar. 15, 2018 in PCT/JP2016/074368 filed Aug. 22, 2016 (with English translation), 12 pages.

(Continued)

*Primary Examiner* — William K Cheung
(74) *Attorney, Agent, or Firm* — Oblon, McClelland, Maier & Neustadt, L.L.P.; Todd S. Gron

(57) ABSTRACT

Provided is a composition capable of providing a formed article that, even when using continuous fibers, has excellent interfacial adhesion between the continuous fibers and a matrix resin, and as a result, has excellent mechanical strength (e.g., impact resistance and flexural strength). One aspect of a composition according to the present invention includes a polymer (A) including an amino group, fibers (B), and a thermoplastic resin (C), in which a content ratio of the fibers (B) is 70 parts by mass or more and 250 parts by mass or less based on 100 parts by mass of the thermoplastic resin (C). Another aspect of the composition according to the present invention includes a polymer (A) including an amino group, a non-woven fabric (B'), and a thermoplastic resin (C).

12 Claims, No Drawings

(56) References Cited

FOREIGN PATENT DOCUMENTS

| | | | |
|---|---|---|---|
| JP | 3360411 | B2 | 10/2002 |
| JP | 2005-213479 | A | 8/2005 |
| JP | 2005213479 | A * | 8/2005 |
| JP | 3988495 | B2 | 10/2007 |
| JP | 2008-169344 | A | 7/2008 |
| JP | 4840140 | B2 | 12/2011 |
| JP | 2013-67051 | A | 4/2013 |
| JP | 2013-147763 | A | 8/2013 |
| JP | 2013-166924 | A | 8/2013 |
| JP | 2013-227459 | A | 11/2013 |
| JP | 5402112 | B2 | 1/2014 |
| JP | 2014-125532 | A | 7/2014 |
| JP | 2014-196584 | A | 10/2014 |
| JP | 2016-65354 | A | 4/2016 |
| JP | 2017-48313 | A | 3/2017 |
| JP | 2017-48314 | A | 3/2017 |
| WO | WO 03/029299 | A1 | 4/2003 |
| WO | WO 2005/073291 | A1 | 8/2005 |
| WO | WO 2014/014052 | A1 | 1/2014 |
| WO | WO 2014/087767 | A1 * | 6/2014 |
| WO | WO 2016/009858 | A1 | 1/2016 |

OTHER PUBLICATIONS

Japanese Office Action dated Jan. 25, 2017 in Patent Application No. 2016-563871 (with English translation), 4 pages.
Japanese Office Action dated Apr. 5, 2017 in Patent Application No. 2016-563871 (with English translation), 3 pages.
Japanese Office Action dated Apr. 5, 2017 in Patent Application No. 2017-027722 (with English translation), 3 pages.
Office Action dated Sep. 26, 2019 issued in corresponding Taiwanese patent application No. 105125305 (with English translation).
Office Action dated Nov. 28, 2019, in Chinese Patent Application No. 201680050714, filed Aug. 22, 2016.

* cited by examiner

COMPOSITION AND FORMED ARTICLE

This application is a national stage application under 35 USC § 371 of international application PCT/JP2016/074368 filed Aug. 22, 2016, which claims priority from Japan application 2015-072649 filed Sep. 2, 2015, and Japan application 2015-243818 filed Dec. 15, 2015, the disclosures of which are incorporated herein in their entirety by reference.

TECHNICAL FIELD

The present invention relates to a composition that includes fibers, and a formed article that is obtained by forming the composition.

BACKGROUND ART

A fiber-reinforced plastic (FRP) is a material produced by binding reinforcing fibers (e.g., glass fibers and carbon fibers) using a resin. The FRP is a composite material that exhibits excellent mechanical strength, heat resistance, formability, and the like. Therefore, the FRP is widely used in a wide variety of fields including the airplane industry, the space industry, the vehicle industry, the building material industry, the sports industry, and the like.

In particular, a carbon fiber-reinforced plastic (CFRP) is characterized by high strength and reduced weight. For example, a thermosetting epoxy resin is mainly reinforced using carbon fibers, and is used as a structural material for producing an airplane. Meanwhile, in recent years, an FRP using a thermoplastic resin has attracted attention because the FRP has such a feature that a forming cycle can be reduced in addition to the above-mentioned characteristics.

In the FRP using the thermoplastic resin as described above, use has been made of continuous fibers as the reinforcing fibers in order to obtain sufficient mechanical strength (see, for example, Patent Literatures 1 and 2). Use has also been made of carbon long fiber-reinforced resin pellets obtained by impregnating carbon long fibers with a thermoplastic resin while aligning the carbon long fibers under tension, and then cutting the resulting fiber-reinforced resin rod (strand) to an arbitrary length (see, for example, Patent Literature 3). A method involving impregnating a mat formed of fibers (non-woven fabric or the like) with a thermoplastic resin to produce a CFRP has also been investigated (see, for example, Patent Literature 4).

CITATION LIST

Patent Literature

[PTL 1] JP-A-10-100174
[PTL 2] JP-A-07-32465
[PTL 3] JP-A-05-112657
[PTL 4] JP-A-2014-125532

SUMMARY OF INVENTION

Technical Problem

An FRP formed article using continuous fibers, a non-woven fabric, or the like as reinforcing fibers normally has higher impact resistance and flexural strength than a short fiber composite material. However, the CFRP produced by the above-mentioned method has insufficient adhesion between the continuous fibers, the non-woven fabric, or the like and a matrix resin in some cases, and is also insufficient in terms of improvements in mechanical properties (e.g., flexural strength) in some cases. Accordingly, when a load (e.g., flexural load) is applied to the CFRP produced by the above-mentioned method, cracks sometimes occur at an interface between the carbon fibers and the matrix resin. The cracks that have thus occurred are sometimes propagated to other interfaces between the continuous fibers and the matrix resin to induce cracks across the formed article, whereby the formed article breaks.

An object of several aspects of the invention is to solve at least some of the above-mentioned problems, and provide a composition capable of providing a formed article having excellent adhesion between fibers and a matrix resin, and also having excellent mechanical strength (e.g., impact resistance and flexural strength).

Solution to Problem

The invention was conceived in order to solve at least some of the above problems, and may be implemented as described below (see the following aspects and application examples).

APPLICATION EXAMPLE 1

According to one aspect of the invention, a composition includes:
a polymer (A) including an amino group;
fibers (B); and
a thermoplastic resin (C),
wherein a content ratio of the fibers (B) is 70 parts by mass or more and 250 parts by mass or less based on 100 parts by mass of the thermoplastic resin (C).

APPLICATION EXAMPLE 2

In the composition according to Application Example 1, a content ratio of the polymer (A) including an amino group may be 0.1 parts by mass or more and 10 parts by mass or less based on 100 parts by mass of the thermoplastic resin (C).

APPLICATION EXAMPLE 3

In the composition according to Application Example 1 or 2, the fibers (B) may be carbon fibers.

APPLICATION EXAMPLE 4

In the composition according to any one of Application Examples 1 to 3, the polymer (A) including an amino group may be a conjugated diene-based polymer.

APPLICATION EXAMPLE 5

In the composition according to any one of Application Examples 1 to 4, the fibers (B) may each have a fiber length of 50 mm or more.

APPLICATION EXAMPLE 6

According to one aspect of the invention, a composition may include:
a polymer (A) including an amino group;
a non-woven fabric (B'); and
a thermoplastic resin (C).

APPLICATION EXAMPLE 7

In the composition according to Application Example 6, the non-woven fabric (B') may contain recycled fibers.

APPLICATION EXAMPLE 8

In the composition according to Application Example 6 or 7, a content ratio of the non-woven fabric (B') may be 50 parts by mass or more and 150 parts by mass or less based on 100 parts by mass of the thermoplastic resin (C).

APPLICATION EXAMPLE 9

In the composition according to any one of Application Examples 6 to 8, the non-woven fabric (B') may include carbon fibers.

APPLICATION EXAMPLE 10

In the composition according to any one of Application Examples 6 to 9, a content ratio of the polymer (A) including an amino group may be 0.1 parts by mass or more and 10 parts by mass or less based on 100 parts by mass of the thermoplastic resin (C).

APPLICATION EXAMPLE 11

In the composition according to any one of Application Examples 1 to 10, the thermoplastic resin (C) may be an olefin-based resin.

APPLICATION EXAMPLE 12

According to one aspect of the invention, a formed article may be produced using the composition according to any one of Application Examples 1 to 11.

Advantageous Effects of Invention

According to the composition of the invention, the formed article having excellent adhesion between fibers and a matrix resin, and also having excellent mechanical strength (e.g., impact resistance and flexural strength) can be produced.

DESCRIPTION OF EMBODIMENTS

The exemplary embodiments of the invention are described in detail below. Note that the invention is not limited to the following exemplary embodiments. It is intended that the invention includes various modifications that can be implemented without departing from the scope of the invention.

Note that the term "polymer (A) including an amino group" may be referred to herein as "component (A)", the term "fibers (B)" may be referred to herein as "component (B)", the term "non-woven fabric (B')" may be referred to herein as "component (B')", and the term "thermoplastic resin (C)" may be referred to herein as "component (C)".

1. COMPOSITION

Normally, when a load (e.g., flexural load) is applied to an FRP formed article using continuous fibers, a non-woven fabric, or the like, cracks are liable to occur at the interface owing to insufficient adhesion between the continuous fibers, the non-woven fabric, or the like and the matrix resin. The cracks that have thus occurred are propagated through other interfaces between the fibers and the matrix resin to induce cracks across the formed article, whereby the formed article breaks.

In order to suppress the occurrence of cracks due to the above-mentioned mechanism, it is necessary to increase the interfacial adhesion between the fibers and the matrix resin. One aspect of a composition according to one embodiment of the invention that implements such an increase in interfacial adhesion includes a polymer (A) including an amino group, fibers (B), and a thermoplastic resin (C), wherein a content ratio of the component (B) is 70 parts by mass or more and 250 parts by mass or less based on 100 parts by mass of the component (C) serving as a matrix resin. Another aspect of the composition according to one embodiment of the invention includes a polymer (A) including an amino group, a non-woven fabric (B'), and a thermoplastic resin (C). Each component included in the composition according to one embodiment of the invention is described below.

1.1. Polymer (A) Including Amino Group

The composition according to one embodiment of the invention includes the polymer (A) including an amino group. It is considered that the component (A) strongly bonds the component (B) or the component (B') to the component (C) in a formed article according to one embodiment of the invention, so that the occurrence of cracks at the interface between the component (B) or the component (B') and the component (C) when a load (e.g., flexural load) is applied to the formed article is suppressed, and the mechanical strength (e.g., flexural strength and falling weight impact strength) of the formed article is improved.

The component (A) to be used in one embodiment of the invention includes an amino group. The amino group may be incorporated in the polymer using an arbitrary method. For example, the amino group may be incorporated in the polymer using a method that incorporates the amino group in the polymer using a modifier that includes an amino group, a method that polymerizes a monomer that includes an amino group to obtain the component (A), or the like. The polymer may be provided with a structure in which an amino group is introduced, by reacting the polymer with a compound that includes an amino group. The component (A) only needs to include an amino group as a functional group, and may include an alkoxysilyl group. Note that the term "amino group" used herein refers to one of a primary amino group ($-NH_2$), a secondary amino group ($-NHR$, where R is a hydrocarbon group), and a tertiary amino group ($-NRR'$, where R and R' are each a hydrocarbon group). The amino group may be protected with a protecting group. Among the above-mentioned hydrocarbon groups, an alkyl group is preferable, an alkyl group having 1 to 8 carbon atoms is more preferable, and an alkyl group having 1 to 6 carbon atoms is particularly preferable. Examples of such alkyl group include a methyl group, an ethyl group, a propyl group, an isopropyl group, a butyl group, an isobutyl group, a sec-butyl group, a tert-butyl group, a pentyl group, a heptyl group, a hexyl group, a 2,2-dimethylbutyl group, a 2,3-dimethylbutyl group, a 2-ethylbutyl group, a 2-methylpentyl group, a 3-methylpentyl group, a heptyl group, an octyl group, and a 2-ethylhexyl group.

The number of amino groups per molecular chain of the component (A) is preferably 1 or more, more preferably 5 or more, and particularly preferably 10 or more. The number of amino groups per molecular chain of the component (A) is preferably adjusted to 100 or less, and more preferably 50 or less, in order to prevent a situation in which the polymer gels during production. The number of amino groups included in the component (A) may be quantitatively determined using an arbitrary method. For example, the number of amino groups included in the component (A) may be quantitatively determined using an IR method, an NMR method, an amine titration method, or the like. When the number of amino groups included in the component (A) is within the above range, it is considered that adhesion to the component (B) further increases, and the mechanical strength of a formed article obtained by forming the composition according to one embodiment of the invention is further improved.

The polystyrene-equivalent weight average molecular weight (Mw) of the component (A) determined by gel permeation chromatography (GPC) is preferably 30,000 to 2,000,000, more preferably 40,000 to 1,000,000, and particularly preferably 50,000 to 500,000. The melt flow rate (MFR) (230° C., 2.16 kg) of the component (A) measured in accordance with JIS K 7210 is preferably 0.1 to 100 g/10 min, more preferably 0.2 to 50 g/10 min, and particularly preferably 0.3 to 30 g/10 min.

The component (A) is preferably a conjugated diene-based polymer including a repeating unit derived from a conjugated diene. The component (A) may include an optional repeating unit derived from a monomer other than a conjugated diene. The component (A) may be a block polymer that includes repeating units formed by an identical monomer, or may be a random polymer in which different monomers are randomly polymerized. It is preferable that the component (A) be a block copolymer in order to ensure that the component (A) and the component (C) exhibit improved mutual solubility, and the component (B) or the component (B') and the component (C) are more strongly bonded to each other. In particular, it is preferable that the component (A) be a hydrogenated polymer from the viewpoint of improving the weatherability and the mechanical strength of the resulting formed article. The structural components of the polymer (A) including an amino group are described in detail below.

1.1.1. Conjugated Diene

It is preferable that the component (A) include a repeating unit derived from a conjugated diene. Examples of the conjugated diene include 1,3-butadiene, isoprene, 2,3-dimethyl-1,3-butadiene, 1,3-pentadiene, 2-methyl-1,3-octadiene, 1,3-hexadiene, 1,3-cyclohexadiene, 4,5-diethyl-1,3-octadiene, 3-butyl-1,3-octadiene, myrcene, farnesene, chloroprene, and the like. It is preferable that the component (A) include a repeating unit derived from 1,3-butadiene or isoprene as the repeating unit derived from a conjugated diene so that a formed article that exhibits excellent mechanical strength and excellent cold resistance can be obtained.

1.1.2. Monomer Other than Conjugated Diene

The component (A) may include a repeating unit derived from a compound other than a conjugated diene. An aromatic alkenyl compound is preferable as such a compound. An unsaturated monomer represented by the following general formula (1) is preferable as the aromatic alkenyl compound since a formed article that exhibits excellent mechanical strength, excellent heat resistance, and excellent cold resistance can be obtained.

[Chem. 1]

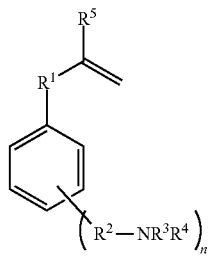

(1)

wherein $R^1$ is a single bond or a divalent hydrocarbon group having 1 to 3 carbon atoms, $R^3$ and $R^4$ are independently an alkyl group having 1 to 3 carbon atoms, or a trialkylsilyl group having 3 to 18 carbon atoms, or one of $R^3$ and $R^4$ is a trialkylsilyl group having 3 to 18 carbon atoms, and the other of $R^3$ and $R^4$ is an alkyl group having 1 to 20 carbon atoms, an aryl group having 6 to 20 carbon atoms, an aralkyl group having 7 to 20 carbon atoms, or an organosiloxy group having 1 to 100 carbon atoms, $R^2$ is a single bond, an alkylene group having 1 to 20 carbon atoms, or an alkylidene group having 1 to 20 carbon atoms, $R^5$ is a hydrogen atom or a methyl group, and n is an integer from 0 to 3.

Specific examples of the aromatic alkenyl compound include styrene, tert-butyl styrene, alpha-methyl styrene, p-methylstyrene, p-ethylstyrene, divinylbenzene, 1,1-diphenylstyrene, 1-vinylnaphthalene, 2-vinylnaphthalene, 2-vinylanthracene, 9-vinylanthracene, p-vinylbenzyl propyl ether, p-vinylbenzyl butyl ether, p-vinylbenzyl hexyl ether, p-vinylbenzyl pentyl ether, m-N,N-diethylaminoethylstyrene, p-N,N-diethylaminoethylstyrene, p-N,N-dimethylaminoethylstyrene, o-vinylbenzyldimethylamine, p-vinylbenzyldimethylamine, p-vinylbenzyldiethylamine, p-vinylbenzyldi(n-propyl)amine, p-vinylbenzyldi(n-butyl)amine, vinylpyridine, 2-vinylbiphenyl, 4-vinylbiphenyl, p-[N,N-bis(trimethylsilyl)amino]styrene, p-[N,N-bis(trimethylsilyl)aminomethyl]styrene, p-{2-[N,N-bis(trimethylsilyl)amino]ethyl}styrene, m-[N,N-bis(trimethylsilyl)amino]styrene, p-(N-methyl-N-trimethylsilylamino)styrene, p-(N-methyl-N-trimethylsilylaminomethyl)styrene, and the like. These monomers may be used either alone or in combination. It is preferable that the component (A) include a repeating unit derived from styrene or p-methylstyrene as the repeating unit derived from a compound other than a conjugated diene so that a formed article that exhibits excellent mechanical strength, excellent heat resistance, and excellent cold resistance can be obtained.

When the component (A) includes a repeating unit derived from a conjugated diene and a repeating unit derived from an aromatic alkenyl compound, it is preferable that the component (A) include the repeating unit derived from a conjugated diene and the repeating unit derived from an aromatic alkenyl compound in a mass ratio of 100:0 to 20:80, and more preferably 97:3 to 40:60, so that the glass transition temperature of the component (A) is maintained at a moderate level, and the mechanical strength and the cold resistance of the resulting formed article are improved.

1.1.3. Configuration of Polymer Blocks

It is preferable that the component (A) be a block copolymer so that the mutual solubility with the component (C) is improved and the component (B) and the component (C) are more strongly bonded to each other. It is more preferable that the component (A) be a block polymer that includes two or more polymer blocks selected from the following polymer blocks A to D.

Polymer block A: A polymer block that includes a repeating unit derived from an aromatic alkenyl compound in a ratio of 80 mass % or more Polymer block B: A polymer block that includes a repeating unit derived from a conjugated diene in a ratio of 80 mass % or more, and has a vinyl bond content of less than 30 mol %

Polymer block C: A polymer block that includes a repeating unit derived from a conjugated diene in a ratio of 80 mass % or more, and has a vinyl bond content of 30 to 90 mol %

Polymer block D: A random copolymer block that includes a repeating unit derived from a conjugated diene and a repeating unit derived from an aromatic alkenyl compound, and excludes the polymer blocks A to C When the component (A) includes the polymer block C, molecular entanglement and mutual solubility with an olefin-based resin (i.e., component (C)) are improved, and the mechanical strength of the resulting formed article is further improved. The vinyl bond content in the polymer block C is more preferably 50 to 90 mol %, and particularly preferably 60 to 90 mol %. It is preferable that the polymer block C has been hydrogenated so that molecular entanglement and mutual solubility with an olefin-based resin are significantly improved.

When the polymer block is a copolymer block that is formed by two or more compounds, the polymer block may be a random polymer block, or may be a tapered polymer block in which the content of a repeating unit derived from an aromatic alkenyl compound, or the content of a repeating unit derived from a conjugated diene continuously changes within the polymer block.

Note that the term "vinyl bond content" used herein refers to the total content (mol %) of repeating units derived from a conjugated diene that are included in the unhydrogenated polymer through a 1,2-bond or a 3,4-bond (among a 1,2-bond, a 3,4-bond, and a 1,4-bond). The vinyl bond content (1,2-bond content and 3,4-bond content) may be calculated by infrared absorption spectrometry (Morello method).

Examples of the block polymer that includes two or more polymer blocks selected from the polymer blocks A to D include A-B, A-C, A-D, B-C, B-D, [A-B]x-Y, [A-C]x-Y, [A-D]x-Y, [B-C]x-Y, [B-D]x-Y, [B-A]x-Y, [C-A]x-Y, [D-A]x-Y, A-B-D, A-B-A, A-C-A, A-C-B, A-D-A, B-A-B, [A-B-D]x-Y, [A-B-A]x-Y, [A-C-A]x-Y, [A-C-B]x-Y, [A-D-A]x-Y, [B-A-B]x-Y, A-B-A-B, B-A-B-A, [A-B-A-B]x-Y, A-B-A-B-A, [A-B-A-B-A]x-Y, B-A-B-D, B-A-B-A, B-A-C-A, B-A-C-B, B-A-D-A, [C-A-B-D]x-Y, [C-A-B-A]x-Y, [C-A-C-A]x-Y, [C-A-C-B]x-Y, [C-A-D-A]x-Y, C-A-B-A-B, C-B-A-B-A, C-A-B-A-C, [C-A-B-A-B]x-Y, C-A-B-A-B-A, and [C-A-B-A-B-A]x-Y (wherein x is an integer equal to or larger than 2, and Y is a linking group). When the block polymer has a structure that includes square brackets and Y, the block that is situated closest to Y is bonded directly to Y. For example, when the block polymer has the structure represented by [A-C-B]x-Y, x [A-C-B] are bonded directly to Y through the polymer block B.

When the composition according to one embodiment of the invention is pelletized, it is preferable that the conjugated diene block copolymer include at least one of the polymer block A and the polymer block B as a block component that is situated on the outer side.

It is preferable that the block polymer have the structure represented by A-C-A, A-C-B, [B-C]x-Y, [A-C]x-Y, [A-D]x-Y, or A-D-A since a composition in which adhesion between the component (B) and the component (C) is improved, and the component (A) and the component (C) exhibit high mutual solubility is obtained. It is preferable that the block polymer include the polymer block C or the polymer block D since the block polymer exhibits excellent mutual solubility with an olefin-based resin that may be used as the component (C), and an excellent interface-reinforcing effect can be obtained. It is preferable that the polymer block A include an amino group so that adhesion to the component (B) is improved.

The linking group Y is a structural unit that is derived from a coupling agent. Examples of the coupling agent include a halogen compound such as methyldichlorosilane, methyltrichlorosilane, butyltrichlorosilane, tetrachlorosilane, dibromoethane, tetrachlorotin, butyltrichlorotin, tetrachlorogermanium, and bis(trichlorosilyl)ethane; an epoxy compound such as epoxidized soybean oil; a carbonyl compound such as diethyl adipate, dimethyl adipate, dimethylterephthalic acid, and diethylterephthalic acid; a polyvinyl compound such as divinylbenzene; a polyisocyanate; and the like. These coupling agents may be used either alone or in combination. The reaction temperature employed when effecting the coupling reaction is preferably 0 to 120° C., and more preferably 50 to 100° C. The reaction time is preferably 1 to 30 minutes, and more preferably 5 to 20 minutes.

1.1.4. Hydrogenation

It is preferable that the component (A) be a hydrogenated polymer so that the weatherability and the mechanical strength of the formed article according to one embodiment of the invention are improved. In particular, when an olefin-based resin is used as the component (C), it is possible to significantly improve the molecular entanglement and the mutual solubility of the component (A) and the olefin-based resin, and further improve the adhesion between the component (B) and the component (C) by utilizing a hydrogenated polymer as the component (A).

The hydrogenation rate of the polymer can be controlled by changing the amount of hydrogenation catalyst, the hydrogen pressure or the reaction time employed when effecting the hydrogenation reaction, and the like. For example, the hydrogenation reaction is effected at 20 to 150° C. under a hydrogen pressure of 0.1 to 10 MPa in the presence of a hydrogenation catalyst. The hydrogenation rate is preferably 60% or more, more preferably 80% or more, and particularly preferably 95% or more, based on the double bonds (e.g., vinyl bond). Hydrogenation may be effected after completion of the polymerization reaction, and the modifier may be reacted with the resulting product, or the modifier may be reacted with the product obtained by the polymerization reaction, and hydrogenation may then be effected.

Examples of the hydrogenation catalyst and a specific hydrogenation method include those disclosed in JP-A-1-275605, JP-A-5-271326, JP-A-5-271325, JP-A-5-222115, JP-A-11-292924, JP-A-2000-37632, JP-A-59-133203, JP-A-63-5401, JP-A-62-218403, JP-A-7-90017, JP-B-43-19960, JP-B-47-40473, and the like.

The weight average molecular weight (Mw) of the hydrogenated polymer is preferably 30,000 to 2,000,000, more preferably 40,000 to 1,000,000, and particularly preferably 50,000 to 500,000. When the weight average molecular weight (Mw) of the hydrogenated polymer is within the above range, it is possible to improve the strength and the dimensional stability of the resulting formed article. When the weight average molecular weight (Mw) of the hydrogenated polymer is within the above range, the composition according to one embodiment of the invention has moderate solution viscosity and melt viscosity, and the formability of the composition is further improved. Note that the term "weight average molecular weight" used herein refers to a polystyrene-equivalent weight average molecular weight determined by gel permeation chromatography (GPC).

1.1.5. Method for Producing Component (A)

The component (A) may be produced using the method disclosed in Japanese Patent No. 5402112, Japanese Patent No. 4840140, WO2003/029299, or the like, for example. When the component (A) is a block polymer, the component (A) may be produced using the method disclosed in Japanese Patent No. 3134504, Japanese Patent No. 3360411, Japanese Patent No. 3988495, WO2014/014052, or the like, for example. Specific examples of the method for producing the component (A) include the following production methods (a) to (c). Note that a polymer obtained as described below may optionally be hydrogenated as described above.

1.1.5.1. Production Method (a)

The production method (a) polymerizes a conjugated diene either alone or together with an aromatic alkenyl compound in the presence of at least one of an organic alkali metal compound and an organic alkaline-earth metal compound, and reacts the resulting polymer with a modifier. The polymer may optionally be hydrogenated. When the modifier is a compound that includes an alkoxysilyl group and an amino group, the introduction can be performed at a high introduction rate.

The polymer is preferably reacted with the modifier at 0 to 120° C. The reaction time is preferably 1 to 30 minutes. The modifier is preferably reacted with the polymer in a ratio of 10 mol % or more.

Examples of the compound that includes an amino group include a compound represented by the following general formula (2), a compound represented by the following general formula (3), and a compound represented by the following general formula (4).

<Compound Represented by General Formula (2)>

$$R^6_{(4-m-n)}Si(OR^7)_m X_n \qquad (2)$$

In the general formula (2), $R^6$ is an alkyl group having 1 to 20 carbon atoms, an aryl group having 6 to 20 carbon atoms, an aralkyl group having 7 to 20 carbon atoms, or an organosiloxy group having 1 to 100 carbon atoms. A plurality of $R^6$ are either identical to or different from each other when a plurality of $R^6$ are present. $R^7$ is an alkyl group having 1 to 20 carbon atoms, an aryl group having 6 to 20 carbon atoms, or an aralkyl group having 7 to 20 carbon atoms. A plurality of $R^7$ are either identical to or different from each other when a plurality of $R^7$ are present.

X is a group represented by -A-X' (wherein A is an alkylene group having 1 to 20 carbon atoms, and X' is a group that includes at least an N atom). A plurality of X are either identical to or different from each other when a plurality of X are present. Each X may be an independent substituent, or may form a cyclic structure. m and n are an integer from 1 to 3. The sum of m and n is an integer from 2 to 4.

The compounds disclosed in Japanese Patent No. 3988495, WO2014/014052, and the like may be used as the compound represented by the general formula (2). Among these, N,N-bis(trimethylsilyl)aminopropyltrimethoxysilane, N,N-bis(trimethylsilyl)aminopropylmethyldimethoxysilane, N,N-bis(trimethylsilyl)aminopropylmethyldiethoxysilane, N,N-bis(trimethylsilyl)aminopropyldimethylmethoxysilane, N,N-bis(trimethylsilyl)aminopropyldimethylethoxysilane, N-methyl-N-trimethylsilylaminopropylmethyldiethoxysilane, 1-(3-triethoxysilylpropyl)-2,2,5,5-tetramethyl-1-aza-2,5-disilacyclopentane, 3-morpholinopropyldimethylmethoxysilane, 3-(4-methylpiperazin-1-yl)propyldimethylmethoxysilane, and the like are preferable.

<Compound Represented by General Formula (3)>

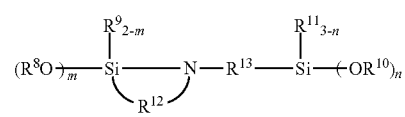

$$(R^8O)_m-\underset{\underset{R^{12}}{|}}{\overset{\overset{R^9_{2-m}}{|}}{Si}}-N-R^{13}-\underset{}{\overset{\overset{R^{11}_{3-n}}{|}}{Si}}-(OR^{10})_n \qquad (3)$$

In the general formula (3), $R^8$ to $R^{11}$ are independently an alkyl group having 1 to 20 carbon atoms or an aryl group, $R^{12}$ and $R^{13}$ are an alkylene group having 1 to 20 carbon atoms, m is 1 or 2, and n is an integer from 1 to 3. Note that the total number of alkoxy groups having 1 to 20 carbon atoms included in the compound represented by the general formula (3) is preferably 4 or more.

The compounds disclosed in WO2003/029299, WO2014/014052, and the like may be used as the compound represented by the general formula (3).

<Compound Represented by General Formula (4)>

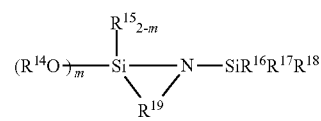

$$(R^{14}O)_m-\underset{\underset{R^{19}}{\diagdown}}{\overset{\overset{R^{15}_{2-m}}{|}}{Si}}-N-SiR^{16}R^{17}R^{18} \qquad (4)$$

In the general formula (4), $R^{14}$ and $R^{15}$ are independently an alkyl group having 1 to 20 carbon atoms or an aryl group, and $R^{19}$ is an alkylene group having 1 to 20 carbon atoms. $R^{16}$, $R^{17}$, and $R^{18}$ are independently an alkyl group having 1 to 20 carbon atoms or an aryl group, provided that two groups among $R^{16}$, $R^{17}$, and $R^{18}$ are optionally bonded to each other to form a ring together with the silicon atom that is bonded thereto. m is 1 or 2.

Examples of the compound represented by the general formula (4) include 1-trimethylsilyl-2,2-diethoxy-1-aza-2-silacyclopentane, a dimethoxysilyl compound, a methylethoxysilyl compound, an ethylethoxysilyl compound, a methylmethoxysilyl compound, an ethylmethoxysilyl compound, and the like that correspond to the diethoxysilyl compound.

Examples of the organic alkali metal compound include an organolithium compound and an organosodium compound. Among these, an organolithium compound is preferable. Examples of the organolithium compound include an organic monolithium compound, an organic dilithium compound, and an organic polylithium compound.

The compounds disclosed in Japanese Patent No. 3988495, WO2014/014052, and the like may be used as the organolithium compound. Among these, n-butyllithium, sec-butyllithium, tert-butyllithium, and 1,3-phenylenebis(3-methyl-1-phenylpentylidene)bislithium are preferable.

Note that the organic alkali metal compound may be an organic alkali metal compound that includes an amino group. Examples of such a compound include a compound represented by the following general formula (5) and a compound represented by the following general formula (6).

[Chem. 4]

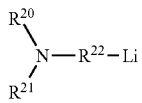
(5)

In the general formula (5), $R^{20}$ and $R^{21}$ are a trialkylsilyl group having 3 to 18 carbon atoms, or one of $R^{20}$ and $R^{21}$ is a trialkylsilyl group having 3 to 18 carbon atoms, and the other of $R^{20}$ and $R^{21}$ is an alkyl group having 1 to 20 carbon atoms, an aryl group having 6 to 20 carbon atoms, an aralkyl group having 7 to 20 carbon atoms, or an organosiloxy group having 1 to 100 carbon atoms. $R^{22}$ is an alkylene group having 1 to 20 carbon atoms, or an alkylidene group having 1 to 20 carbon atoms.

[Chem. 5]

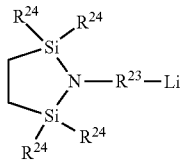
(6)

In the general formula (6), $R^{23}$ is an alkylene group having 1 to 20 carbon atoms, or an alkylidene group having 1 to 20 carbon atoms. $R^{24}$ is an alkyl group having 1 to 20 carbon atoms, an aryl group having 6 to 20 carbon atoms, an aralkyl group having 7 to 20 carbon atoms, or an organosiloxy group having 1 to 100 carbon atoms.

The compounds disclosed in Japanese Patent No. 3988495, WO2014/014052, and the like may be used as the organic alkali metal compound represented by the general formula (5) and the organic alkali metal compound represented by the general formula (6).

Examples of the organic alkaline-earth metal compound include an organomagnesium compound, an organocalcium compound, an organostrontium compound, and an organobarium compound. Specific examples of the organic alkaline-earth metal compound include ethylbutylmagnesium, di-n-butylmagnesium, di-n-hexylmagnesium, diethoxycalcium, calcium distearate, di-t-butoxystrontium, diethoxybarium, diisopropoxybarium, diethylmercaptobarium, di-t-butoxybarium, diphenoxybarium, diethylaminobarium, barium distearate, diketylbarium, and the like.

These organic alkali metal compounds and organic alkaline-earth metal compounds may be used either alone or in combination. The organic alkali metal compound and the organic alkaline-earth metal compound are preferably used in a ratio of 0.02 to 15 parts by mass based on 100 parts by mass of the monomer (e.g., conjugated diene and additional monomer) in total.

1.1.5.2. Production Method (b)

The production method (b) reacts a polymer obtained by polymerizing a conjugated diene and an aromatic alkenyl compound, or polymerizing a conjugated diene, an aromatic alkenyl compound, and an additional monomer, with a modifier in the presence of at least one organic alkali metal compound and/or organic alkaline-earth metal compound, and at least one aliphatic amine compound. Examples of the organic alkali metal compound, the organic alkaline-earth metal compound, and the modifier include those mentioned above in connection with the production method (a) (see "1.1.5.1. Production method (a)").

An aliphatic tertiary amine is preferable as the aliphatic amine compound. Examples of the aliphatic tertiary amine include an ethylenediamine derivative, a propylenediamine derivative, and polyethylenimine. Among these, an ethylenediamine derivative is preferable, and N,N, N',N'-tetramethylethylenediamine is more preferable.

The production method (b) subjects the polymer that includes a repeating unit derived from the aromatic alkenyl compound to the modification reaction in a solvent. The block copolymer that has been isolated may be dissolved in the solvent, or the copolymer solution obtained by the polymerization reaction or the hydrogenation reaction may be used directly.

The organic alkali metal compound and the organic alkaline-earth metal compound are preferably used in a 0.01 to 5-fold molar ratio with respect to the aromatic alkenyl compound. The aliphatic amine compound is preferably used in a 0.8 to 5-fold molar ratio with respect to the organic alkali metal compound and the organic alkaline-earth metal compound. The modifier is preferably used in a 0.5 to 2-fold molar ratio with respect to the organic alkali metal compound and the organic alkaline-earth metal compound.

A first-stage reaction is effected by adding at least one compound selected from the group consisting of the organic alkali metal compound and the organic alkaline-earth metal compound, and the aliphatic amine compound, to the copolymer solution. At least one compound selected from the group consisting of the organic alkali metal compound and the organic alkaline-earth metal compound, and the aliphatic amine compound, may be added in an arbitrary order. At least one compound selected from the group consisting of the organic alkali metal compound and the organic alkaline-earth metal compound, and the aliphatic amine compound, may be added at the same time. The reaction temperature is preferably 20 to 120° C. The reaction time is preferably 0 to 120 minutes. A second-stage reaction is effected by adding the modifier to the reaction solution obtained by the first-stage reaction. The reaction temperature is preferably 20 to 120° C. The reaction time is preferably 0 to 120 minutes. The product obtained by the second-stage reaction may optionally be hydrogenated.

1.1.5.3. Production Method (c)

The production method (c) polymerizes a conjugated diene either alone or together with an aromatic alkenyl compound in the presence of at least one of an organic alkali metal compound and an organic alkaline-earth metal compound, and reacts the resulting polymer with a peroxide and a modifier in a solution or a mixer (e.g., extruder). Examples of the organic alkali metal compound, the organic alkaline-earth metal compound, and the modifier include those mentioned above in connection with the production method (a) (see "1.1.5.1. Production method (a)").

The peroxide is not particularly limited. Examples of the peroxide include an organic peroxide such as 1,1-di-t-butylperoxy-3,3,5-trimethylcyclohexane, di-t-butyl peroxide, dicumyl peroxide, t-butylcumyl peroxide, 2,5-dimethyl-2,5-di(t-butylperoxy)hexane, 2,5-dimethyl-2,5-di(t-butylperoxy)hexyne-3, and 1,3-bis(t-butylperoxyisopropyl)benzene, and the like. These peroxides may be used either alone or in combination. The peroxide is preferably used in a ratio of 0.001 to 3 parts by mass based on 1 part by mass of the modifier.

The mixing-heating method is not particularly limited. A batch-type melt mixer such as an open mixing roll, an internal Banbury mixer, or a kneader, or a continuous melt mixer such as a single-screw extruder, a co-rotating continuous twin-screw extruder, or a counter-rotating continuous twin-screw extruder, may be used. The heating temperature is preferably 100 to 300° C. The heating time is preferably 10 to 900 seconds.

1.2. Fibers (B)

Continuous fibers may be used as the fibers (B). The "continuous fibers" in the present invention refer to fibers each having a fiber length of 50 mm or more, preferably 100 mm or more, and more preferably 300 mm or more, or an assembly of the fibers. When the continuous fibers are an assembly, the shape of the continuous fibers may be any of a roving (tow), a rod, a braid, a strand, and a grid. The continuous fibers may be contained in the matrix resin in the shape of a woven and knitted fabric, a sheet, such as a unidirectionally arranged sheet-like product of strands and a multi-axis fabric, or a non-woven fabric. The continuous fibers may be opened before use.

It is preferable that the continuous fibers be aligned in one direction in an FRP formed article, and be free of discontinuation in the direction. It is also preferable that the continuous fibers be a cloth material made of a woven unidirectional material in the FRP formed article. When the FRP formed article has any of those forms, its mechanical strength is extremely excellent. When a prepreg obtained by impregnating the continuous fibers aligned in one direction with the matrix resin is used, and a plurality of sheets thereof are laminated in the axial direction of the fibers, a direction perpendicular thereto, or an oblique direction, it is possible to secure the isotropy of the mechanical properties.

An FRP formed article using continuous fibers normally has higher impact resistance and flexural strength than a short fiber composite material because the FRP formed article includes the continuous fibers. However, if such FRP formed article has insufficient interfacial adhesion between the continuous fibers and the matrix resin, when a load (e.g., flexural load) is applied to the FRP formed article, cracks are liable to occur at the interface between the continuous fibers and the matrix resin. The cracks that have thus occurred are sometimes propagated to other interfaces between the continuous fibers and the matrix resin to induce cracks across the formed article, whereby the formed article breaks. However, it has been revealed that, even when the fibers (B) to be added are long fibers like the continuous fibers, by adding the component (A) as in the invention of the present application, it is possible to effectively improve mechanical properties (e.g., flexural strength as well as impact resistance).

In injection forming of an FRP using a thermoplastic resin and continuous fibers, the flowability of the composition is lowered owing to the continuous fibers included, and hence blocking occurs in a hopper of an injection molding machine in some cases. However, it has been revealed that, by adding the component (A) as in the invention of the present application, it is possible to effectively suppress the occurrence of blocking in the hopper of the injection molding machine.

A known material may be used as the fibers (B). For example, one type of fibers, or two or more types of fibers, selected from inorganic fibers such as alumina fibers, glass fibers, rock wool, potassium titanate fibers, zirconia fibers, ceramic fibers, silicon fibers, silicon nitride fibers, silica-alumina fibers, kaolin fibers, bauxite fibers, kayanoid fibers, boron fibers, boron nitride fibers, magnesia fibers, and potassium titanate whisker, and organic fibers such as polyester-based fibers, polyamide-based fibers, polyimide-based fibers, polyvinyl alcohol modified fibers, polyvinyl chloride fibers, polypropylene fibers, polybenzimidazole fibers, acrylic fibers, carbon fibers, phenol fibers, nylon fibers, and cellulose (nano)fibers may be used as the component (B). Among these, carbon fibers are preferable.

The lower limit of the fiber diameter of the component (B) is preferably 1 nm or more, more preferably 5 nm or more, and particularly preferably 10 nm or more. The upper limit of the fiber diameter is preferably 10 mm or less, more preferably 5 mm or less, still more preferably 3 mm or less, and particularly preferably 1 mm or less.

The fiber diameter of the component (B) may be measured using a known method. For example, the fiber diameter may be measured by observing the component (B) using a microscope. The fiber diameter of the component (B) in the FRP formed article may be measured by subjecting the formed article to a high-temperature ashing treatment, a dissolution treatment using a solvent, a decomposition treatment using a reagent, or the like to collect a filler residue, and observing the filler residue using a microscope.

The component (B) may optionally be surface-modified with a functional group. Examples of the functional group include a (meth)acryloyl group, an amide group, an amino group, an isocyanate group, an imide group, a urethane group, an ether group, an epoxy group, a carboxy group, a hydroxy group, an acid anhydride group, and the like.

The functional group may be introduced into the component (B) using an arbitrary method. For example, the functional group may be introduced into the component (B) using a method that introduces the functional group into the component (B) by directly reacting the component (B) and a sizing agent, a method that applies a sizing agent to the component (B), or impregnates the component (B) with a sizing agent, and optionally solidifies the sizing agent, or the like. More specifically, the functional group may be introduced into the component (B) using the method disclosed in JP-A-2013-147763 or the like.

The sizing agent may be one material, or two or more materials, selected from the group consisting of an acid, an acid anhydride, an alcohol, a halogenation reagent, an isocyanate, an alkoxysilane, a cyclic ether such as oxirane (epoxy), an epoxy resin, a urethane resin, a urethane-modified epoxy resin, an epoxy-modified urethane resin, an amine-modified aromatic epoxy resin, an acrylic resin, a polyester resin, a phenolic resin, a polyamide resin, a polycarbonate resin, a polyimide resin, a polyetherimide resin, a bismaleimide resin, a polysulfone resin, a polyether sulfone resin, a polyvinyl alcohol resin, and a polyvinylpyrrolidone resin.

The sizing agent may be used in an arbitrary amount when used to prepare a fiber bundle using the component (B). For example, the sizing agent is used in a ratio of 0.1 to 10 parts by mass based on 100 parts by mass of the component (B).

The carbon fibers, which are suitable as the continuous fibers to be used in one embodiment of the invention, are described below.

Examples of preferable carbon fibers include PAN-based carbon fibers produced using polyacrylonitrile fibers as a raw material, pitch-based carbon fibers produced using coal tar or petroleum pitch as a raw material, cellulose-based carbon fibers produced using viscose rayon, cellulose acetate, or the like as a raw material, vapor-grown carbon fibers produced using a hydrocarbon or the like as a raw material, graphitized fibers thereof, and the like. Note that the carbon fibers in the present invention may be carbon nanotubes or graphenes in the shape of fibers. These carbon fibers may be used either alone or in combination.

1.3. Non-Woven Fabric (B')

Normally, when a load (e.g., flexural load) is applied to an FRP formed article, adhesion between the fibers and the matrix resin is liable to become insufficient, and cracks are liable to occur at an interface between the fibers and the matrix resin. The cracks that have thus occurred are sometimes propagated to other interfaces between the fibers and the matrix resin to induce cracks across the formed article, whereby the formed article breaks. However, it has been revealed that, by adding the component (A) as in the invention of the present application, the adhesion between the component (B') and the component (C) is improved, and thus it is possible to effectively improve mechanical properties (e.g., flexural strength and impact resistance).

The non-woven fabric (B') in the present invention refers to a form in which strands and/or monofilaments of fibers (the strands and the monofilaments are hereinafter collectively referred to as fine-denier strands) are dispersed in a plane with void portions. Examples thereof may include a chopped strand mat, a continuous strand mat, a paper-making mat, a carded mat, and an air-laid mat. The strands are each an assembly of a plurality of single fibers arranged in parallel, and are also called fiber bundles. In the component (B'), the fine-denier strands normally have no regularity in their dispersion state. The use of the component (B') increases steric hindrance between the fibers, and hence can efficiently decrease the ratio of the fibers. The use of the component (B') also provides excellent formability, and hence facilitates forming into a complex shape. The voids in the component (B') complicate the progress of resin impregnation, and hence the component (A) and the component (C) described later form a more complex interface to express excellent adhesion.

It is preferable that the component (B') be a non-woven fabric in which fibers are dispersed substantially in the form of monofilaments. The phrase "dispersed substantially in the form of monofilaments" used herein means that discontinuous fibers forming the component (B') include 50 wt % or more of fine-denier strands each including less than 100 filaments. It is also preferable that the fibers be randomly dispersed in the component (B'). Such component (B') may be produced using a known method. For example, the method disclosed in JP-A-2014-196584 or JP-A-2014-125532 may be used.

Recycled fibers may be used as the fibers contained in the component (B'). The recycled fibers refer to reusable fibers out of recovered fibers obtained by removing a matrix resin from a waste fiber-reinforced resin (FRP), and then recovering fiber portions thereof.

Normally, as a resin decomposition method to be used in the recovery of fibers from the FRP, there are given methods such as thermal decomposition, chemical decomposition, and photodecomposition. However, irrespective of which of the methods is used, a sizing agent may be removed in the treatment process, or functional groups on the surfaces of the carbon fibers may disappear. Accordingly, when regenerated fibers recovered by recycling are reused as an FRP, the mechanical properties (e.g., impact resistance and flexural strength) of the FRP are significantly degraded as compared to those obtained when unused fibers are added. However, it has been revealed that, even when the recycled fibers are used, by adding the component (A) and the component (C) as in the invention of the present application, it is possible to improve the mechanical properties (e.g., impact resistance and flexural strength).

It is preferable that the fibers contained in the component (B') to be used in one embodiment of the invention each have a fiber length of 1 mm or more and 200 mm or less. The lower limit of the fiber length of each of the fibers is preferably 4 mm or more, and more preferably 5 mm or more. The upper limit of the fiber length of each of the fibers is preferably 100 mm or less, and more preferably 50 mm or less.

Fibers each having a fiber diameter similar to that of the component (B) described above may be used as the fibers contained in the component (B') to be used in one embodiment of the invention.

The ratio (aspect ratio) of the fiber length to the fiber diameter of each of the fibers contained in the component (B') is preferably 100 to 30,000, and more preferably 500 to 10,000. When the aspect ratio is within the above-mentioned range, it is possible to further improve the mechanical properties of the formed article. When the aspect ratio is within the above-mentioned range, it is possible to prevent a situation in which the formed article is deformed or becomes anisotropic, and ensure that the formed article exhibits excellent external appearance.

The lower limit of a mass per unit area suitable for the component (B) is preferably 50 g/cm$^2$ or more, and more preferably 80 g/cm$^2$ or more. The upper limit of the mass per unit area is preferably 300 g/cm$^2$ or less, and more preferably 250 g/cm$^2$ or less.

A material similar to that for the component (B) described above may be used as the fibers contained in component (B') to be used in one embodiment of the invention.

Among the fibers mentioned above, carbon fibers are preferable as the fibers contained in the component (B') to be used in one embodiment of the invention. Examples of preferable carbon fibers include PAN-based carbon fibers produced using polyacrylonitrile fibers as a raw material, pitch-based carbon fibers produced using coal tar or petroleum pitch as a raw material, cellulose-based carbon fibers produced using viscose rayon, cellulose acetate, or the like as a raw material, vapor-grown carbon fibers produced using a hydrocarbon or the like as a raw material, graphitized fibers thereof, and the like. These carbon fibers may be used either alone or in combination.

The fibers contained in the component (B') may each have a surface optionally modified with a functional group. Examples of such functional group include a (meth)acryloyl group, an amide group, an amino group, an isocyanate group, an imide group, a urethane group, an ether group, an epoxy group, a carboxy group, a hydroxy group, and an acid anhydride group.

The functional group may be introduced into the fibers using an arbitrary method. For example, the functional group may be introduced into the fibers using a method that introduces the functional group into the fibers by directly reacting the fibers and a sizing agent, a method that applies a sizing agent to the fibers, or impregnates the fibers with a sizing agent, and optionally solidifies the sizing agent, or the like. More specifically, the functional group may be introduced into the fibers using the method disclosed in JP-A-2013-147763 or the like.

1.4. Thermoplastic Resin (C)

The composition according to one embodiment of the invention includes the thermoplastic resin (C). Examples of the component (C) include an olefin-based resin, a polyester-based resin such as polyethylene terephthalate, polybutylene terephthalate, and polylactic acid, an acrylic-based resin, a styrene-based resin such as polystyrene, an AS resin, and an ABS resin, a polyamide such as nylon 6, nylon 6,6, nylon 12, a semi-aromatic polyamide (nylon 6T, nylon 6I, and nylon 9T), and a modified polyamide, a polycarbonate, polyacetal, a fluororesin, a modified polyphenylene ether, polyphenylene sulfide and a derivative thereof, a polyester elastomer, a polyarylate, a liquid crystal polymer (wholly aromatic liquid crystal polymer and semi-aromatic liquid crystal polymer), a polysulfone, polyethersulfone, polyether ether ketone, polyetherimide, a polyamide-imide, and a polyimide. These thermoplastic resins may be used either alone or in combination. Among these, an olefin-based resin is preferable.

The weight average molecular weight (Mw) of the component (C) is preferably 5,000 to 1,000,000, more preferably 10,000 to 900,000, and particularly preferably 20,000 to 800,000. The ratio (Mw/Mn) of the weight average molecular weight (Mw) to the number average molecular weight (Mn) of the component (C) is not particularly limited, but is preferably 1 to 10, and more preferably 2 to 7.

An olefin-based resin to be suitably used in one embodiment of the invention is described below.

Examples of the olefin-based resin include a homopolymer of an alpha-olefin having about 2 to 8 carbon atoms, such as ethylene, propylene, and 1-butene; a binary or ternary (co)polymer of an alpha-olefin having about 2 to 8 carbon atoms, such as ethylene, propylene, and 1-butene, and an alpha-olefin having about 2 to 18 carbon atoms, such as ethylene, propylene, 1-butene, 3-methyl-1-butene, 1-pentene, 4-methyl-1-pentene, 4,4-dimethyl-1-pentene, 1-hexene, 4-methyl-1-hexene, 1-heptene, 1-octene, 1-decene, and 1-octadecene; and the like.

Specific examples of the olefin-based resin include an ethylene-based resin such as an ethylene homopolymer such as branched low-density polyethylene and linear high-density polyethylene, an ethylene-propylene copolymer, an ethylene-1-butene copolymer, an ethylene-propylene-1-butene copolymer, an ethylene-4-methyl-1-pentene copolymer, an ethylene-1-hexene copolymer, an ethylene-1-heptene copolymer, and an ethylene-1-octene copolymer; a propylene-based resin such as a propylene homopolymer, a propylene-ethylene copolymer, a propylene-ethylene-1-butene copolymer, a propylene-ethylene-4-methyl-1-pentene copolymer, and a propylene-ethylene-1-hexene copolymer; a 1-butene-based resin such as a 1-butene homopolymer, a 1-butene-ethylene copolymer, and a 1-butene-propylene copolymer; a 4-methyl-1-pentene-based resin such as a 4-methyl-1-pentene homopolymer and a 4-methyl-1-pentene-ethylene copolymer; and the like.

These olefin-based resins may be used either alone or in combination. Among these, an ethylene-based resin and a propylene-based resin are preferable, a propylene-based resin is more preferable, an ethylene-propylene copolymer and a propylene homopolymer are still more preferable, and a propylene homopolymer is particularly preferable. In particular, when the component (A) is a block polymer that includes a conjugated diene polymer block that includes a repeating unit derived from a conjugated diene in a ratio of 80 mass % or more, and has a vinyl bond content of 30 to 90 mol %, a propylene-based resin exhibits particularly excellent mutual solubility with the component (A). In this case, the vinyl bond content in the polymer block is more preferably 50 to 90 mol %, and particularly preferably 60 to 90 mol %. It is preferable to hydrogenate the component (A) since mutual solubility and molecular entanglement with a propylene-based resin are significantly improved.

The weight average molecular weight (Mw) of the olefin-based resin is preferably 5,000 to 1,000,000, more preferably 10,000 to 900,000, and particularly preferably 20,000 to 800,000, since the mechanical strength of the resulting formed article is improved. The ratio (Mw/Mn) of the weight average molecular weight (Mw) to the number average molecular weight (Mn) of the olefin-based resin is preferably 1 to 10, and more preferably 2 to 7.

A crystalline polyolefin and an amorphous polyolefin may be used in combination with the olefin-based resin. Examples of the amorphous polyolefin include a homopolymer such as atactic polypropylene and atactic poly-1-butene, a copolymer of propylene and an alpha-olefin other than propylene, a copolymer of 1-butene and an alpha-olefin other than 1-butene, and the like.

1.5. Additional Component

The composition according to one embodiment of the invention may include an additive (e.g., aging preventive, antioxidant, weatherproof agent, metal deactivator, light stabilizer, thermal stabilizer, UV absorber, antibacterial/antifungal agent, deodorant, conductive agent, dispersant, softener, plasticizer, cross-linking agent, co-cross-linking agent, vulcanizing agent, vulcanization aid, blowing agent, blowing aid, colorant, flame retardant, damping agent, nucleating agent, neutralizer, lubricant, anti-blocking agent, dispersant, flow improver, and release agent) in addition to the components described above.

1.6. Content Ratio of Each Component

In the composition according to one embodiment of the invention, the lower limit of the content ratio of the component (A) is preferably 0.1 parts by mass or more, and more preferably 0.5 parts by mass or more, based on 100 parts by mass of the component (C) serving as the matrix resin. The upper limit of the content ratio of the component (A) is preferably 10 parts by mass or less, and more preferably 5 parts by mass or less. When the content ratio of the component (A) is within the above-mentioned range, the component (A) can strongly bond the component (B) or the component (B') to the component (C). It is considered that, as a result, the occurrence of cracks at the interface between the component (B) or the component (B') and the component (C) when a load (e.g., flexural load) is applied is suppressed, and the mechanical strength (e.g., flexural strength and falling weight impact strength) of the formed article is improved.

In the composition according to one embodiment of the invention, the lower limit of the content ratio of the component (B) is 70 parts by mass or more, and preferably 75 parts by mass or more, based on 100 parts by mass of the component (C) serving as the matrix resin. The upper limit of the content ratio of the component (B) is 250 parts by mass or less, preferably 240 parts by mass or less, and more preferably 230 parts by mass or less, based on 100 parts by mass of the component (C) serving as the matrix resin. When the content ratio of the component (B) is within the above-mentioned range, it is possible to improve the impact resistance, flexural strength, and falling weight impact strength of the resulting formed article.

In the composition according to one embodiment of the invention, the lower limit of the content ratio of the component (B') is preferably 50 parts by mass or more, and more preferably 70 parts by mass or more, based on 100 parts by mass of the component (C) serving as the matrix resin. The upper limit of the content ratio of the component (B') is preferably 150 parts by mass or less, and more preferably 100 parts by mass or less. When the content ratio of the component (B') is within the above-mentioned range, it is possible to improve the mechanical strength (e.g., flexural strength and falling weight impact strength) of the resulting formed article.

1.7. Method for Producing Composition

The composition according to one embodiment of the invention may be produced by mixing the component (A), the component (B), the component (C), and an optional additional component. The mixing method is not particularly limited. The composition may be produced by mixing (kneading) the component (A), the component (B), and the component (C) at one time, or may be produced by mixing the component (A) and the component (C) to prepare a composition (masterbatch), and mixing the composition (masterbatch) with the component (B). Alternatively, the component (A) may be applied to the component (B) as a sizing agent before mixing (kneading) with the component (C).

The composition according to one embodiment of the invention may be produced by impregnating the component (B') with the component (A), the component (C), and an optional additional component. The impregnation method is not particularly limited. The component (A) and the component (C) may be mixed before the impregnation of the component (B') in the mixture. Alternatively, the component (A) may be applied to the component (B') as a sizing agent before impregnation with the component (C).

1.7.1. When Component (A) is Used as Sizing Agent

When the component (A) is used as a sizing agent, the polymer solution that includes the polymer including an amino group produced using the method for producing the component (A) described above may be used directly as the sizing agent. The component (A) may be separated from the polymer solution, dissolved in a solvent, and used in the form of a solution. Alternatively, the component (A) may be separated from the polymer solution, dispersed in a dispersion medium, and used in the form of an emulsion (latex). When the component (A) is applied to the surface of the component (B) or the component (B') in advance as a sizing agent, the composition according to one embodiment of the invention may have a configuration in which the component (A) is unevenly distributed at the interface between the component (B) or the component (B') and the component (C). In this case, it is possible to effectively improve the adhesion between the component (B) or the component (B') and the component (C) even when the component (A) is used in a small amount. This makes it possible to significantly improve the mechanical strength of the resulting formed article.

When the component (A) is dissolved in a liquid medium, and the resulting solution is applied to the component (B) or the component (B') as a sizing agent, the liquid medium is not particularly limited. Examples of the liquid medium include a hydrocarbon-based liquid medium such as an aromatic hydrocarbon such as benzene, toluene, and xylene; an alicyclic hydrocarbon such as cyclopentane, cyclopentene, and cyclohexane; an aliphatic hydrocarbon such as pentane, hexane, and heptane; an alcohol such as methanol, ethanol, propanol, 2-propanol, ethylene glycol, and glycerol; and a halogenated hydrocarbon such as methylene chloride, chloroform, and ethylene dichloride. Among these, an aromatic hydrocarbon, an alicyclic hydrocarbon, and an aliphatic hydrocarbon are preferable, and an aliphatic hydrocarbon is more preferable. The liquid medium is preferably included in the composition according to one embodiment of the invention in a ratio of 100 to 10,000 parts by mass, more preferably 300 to 5,000 parts by mass, and particularly preferably 600 to 3,000 parts by mass, based on 100 parts by mass of the component (A).

When an emulsion prepared by dispersing the component (A) in a liquid medium is applied to the component (B) or the component (B') as a sizing agent, the sizing agent may be prepared using a known emulsification method.

Emulsification may be effected optionally using a surfactant. Examples of the surfactant include a nonionic surfactant such as a polyoxyethylene alkyl ether, a polyoxyethylene alkylphenol ether, a polyoxyethylene alkyl ester, and a polyoxyethylene sorbitan alkyl ester; an alkali metal salt and an alkaline-earth metal salt of a fatty acid such as myristic acid, palmitic acid, oleic acid, linolenic acid, stearic acid, lauric acid, alginic acid, and ricinoleic acid; an alkali metal salt and an alkaline-earth metal salt of a resin acid such as rosin acid, disproportionated rosin acid, and hydrogenated rosin acid; an amine salt of a hydroxyamine of a long-chain fatty acid ester that includes a linear alkyl group or a cycloalkyl group; an anionic surfactant such as an alkylbenzenesulfonate such as sodium dodecylbenzenesulfonate, a higher alcohol sulfuric acid ester salt, and an alkylsulfosuccinic acid salt; a cationic surfactant such as an alkyltrimethylammonium chloride, a dialkylammonium chloride, benzylammonium chloride, and tridecylbenzenehydroxyethylimidazole chloride; a phosphoric ester of a higher alcohol such as capryl alcohol and octyl alcohol; and a monoester of oleic acid and pentaerythritol such as sorbitan monooleate. It is also possible to use a copolymerizable surfactant such as a sulfo ester of an alpha,beta-unsaturated carboxylic acid, a sulfate ester of an alpha,beta-unsaturated carboxylic acid, and a sulfoalkyl aryl ether. Water may suitably be used as the liquid medium.

The surfactant is preferably used in a ratio of 0.5 to 50 parts by mass, and more preferably 0.5 to 20 parts by mass, based on 100 parts by mass of the component (A). When the surfactant is used in a ratio within the above range, the stability of the emulsion tends to be further improved.

The average particle size of the component (A) included in the emulsion is preferably 0.02 to 100 micrometers, more preferably 0.1 to 10 micrometers, and particularly preferably 0.5 to 5 micrometers. When the average particle size of the component (A) included in the emulsion is within the above range, the viscosity of the emulsion can be controlled within a range that facilitates handling, and it is possible to reduce the formation of a film at the gas-liquid interface when the emulsion is stored. The average particle size of the component (A) included in the emulsion may be measured using a particle size distribution analyzer that utilizes a laser diffraction-scattering method as a measurement principle. Examples of such a particle size distribution analyzer include Microtrac MT3000 (manufactured by Nikkiso Co., Ltd.). When an emulsion prepared by dispersing the component (A) in a liquid medium is applied to the component (B) as a sizing agent, water is preferably contained as the liquid medium.

The liquid medium is preferably included in the emulsion in a ratio of 100 to 10,000 parts by mass, more preferably 300 to 5,000 parts by mass, and particularly preferably 600 to 3,000 parts by mass, based on 100 parts by mass of the component (A).

An additive (e.g., pH-adjusting agent, defoamer, preservative, cross-linking agent, chelating agent, oxygen scavenger, and dispersant) that is normally used in the field of a latex may be added to the sizing agent for fibers. Examples of the pH-adjusting agent include an alkali metal hydroxide such as sodium hydroxide and potassium hydroxide; an alkali metal carbonate such as sodium carbonate and potassium carbonate; an alkali metal hydrogen carbonate such as sodium hydrogen carbonate; carbon dioxide; ammonia; and an organic amine compound such as trimethylammonium and triethanolamine. It is preferable to use an alkali metal hydroxide, carbon dioxide, or ammonia.

When the component (A) is applied to the component (B) or the component (B') as a sizing agent, and the component (B) or the component (B') is mixed with the component (C), the component (A) may be applied to the component (B) or the component (B') using an arbitrary method. For example, a spray method, a roller immersion method, a roller transfer method, a guide supply method, or the like may be used. The component (B) may be used in the form of single fibers or a fiber bundle. The component (B) is preferably used in the form of a fiber bundle. After applying the component (A) to the component (B) or the component (B'), the component (B) or the component (B') may be heated using a hot air blower, a heating plate, a roller, an infrared heater, or the like.

1.7.2. Composition Production Conditions

The composition according to one embodiment of the invention may be produced by impregnating the component (A), the component (B) or the component (B'), the component (C), an optional additional component, and the like using a production method disclosed in JP-A-2013-67051, a production method disclosed in JP-A-2013-166924, or the like.

The component (A), the component (C), and an optional additional component may be mixed using a known mixer (e.g., single-screw extruder, twin-screw extruder, Banbury mixer, kneader, and roll), or a combination thereof. The components may be mixed at one time, or some of the components may be mixed in advance, and the remaining components may then be added and mixed (multi-step mixing method).

It is particularly preferable to produce the composition according to one embodiment of the invention using a twin-screw extruder. A co-rotating twin-screw extruder or a counter-rotating twin-screw extruder may suitably be used as the twin-screw extruder. For example, a twin-screw extruder and a twin-screw extruder may be used in a connected state, or a twin-screw extruder and a single-screw extruder may be used in a connected state, or a continuous mixer and a twin-screw extruder may be used in a connected state.

When an extruder is used as the mixer, the ratio "L/D" (i.e., the ratio of the effective length (L) to the diameter (D) of the screw of the extruder) is preferably 30 to 80. A general-purpose kneading disc segment, a rotor segment, a Various Clearance Mixing Technology (VCMT) rotor segment, a twist kneading segment, a backward mixing single flight screw (BMS) segment, or the like may be used as the mixing segment.

The resulting mixture may be supplied to a single-screw extruder or a twin-screw extruder, and melt-mixed under the same mixing conditions as those described above. For example, the component (A), the component (C), and an optional additional component may be melt-mixed using the above mixer under the above mixing conditions, and the above step may optionally be repeated a plurality of times.

When a film is produced, the film is obtained by forming the film using a twin-screw extruder, and winding the film using a film take-up/winding device. However, the film may be obtained using a known method not limited to the above-mentioned method.

The raw material components may be preliminarily mixed using a Henschel mixer or the like before melt-mixing the components. The raw material components or the mixture may optionally be dried using a dehumidification dryer, a hot-air dryer, or the like before or after melt-mixing the components. In this case, the drying temperature is preferably 50° C. or more, and the drying time is preferably 2 hours or more.

2. FORMED ARTICLE

The formed article according to one embodiment of the invention is obtained by forming the composition described above. The composition may be formed using a forming method that is normally employed for a thermoplastic composition. It is preferable to select forming conditions under which breakage of the fibers included in the composition according to one embodiment of the invention can be suppressed. As forming conditions for maintaining the fiber length as much as possible, it is desirable to reduce shearing due to plasticization, by, for example, setting the temperature so as to be higher than a normal plasticizing temperature during forming under a state in which the matrix resin does not have added thereto reinforcing fibers (unreinforced) by 10 to 30° C. When conditions under which the fiber length is increased are adopted for the forming as described above, it is possible to achieve a resin formed article reinforced by the fibers dispersed in the formed article formed from the composition according to one embodiment of the invention.

A known method may be applied as the forming method. Conditions under which the shearing of the fibers due to plasticization is reduced may be appropriately selected. For example, an injection forming method, an extrusion method, a blow forming method, a foaming method, a pressing method, or the like may be used. The component (B) or the component (B') may be formed in advance to have the desired shape (e.g., sheet-like shape), and impregnated with a mixture including the component (A) and the component (C) that have been melted to produce a formed article.

A formed article that exhibits excellent mechanical strength can be produced by utilizing the composition according to one embodiment of the invention.

The formed article according to one embodiment of the invention that has the above properties may suitably be used as an automotive material (e.g., automotive interior material, skin, and bumper), a housing used for a home electrical product, a home appliance material, a packing material, a constructional material, a civil engineering material, a fishery material, other industrial materials, and the like. When carbon fibers are used as the fibers, it is possible to use the formed article as an electromagnetic absorption material by appropriately adjusting the degree of orientation of the carbon fibers within the resin.

3. EXAMPLES

The invention is further described below by way of examples. Note that the invention is not limited to the following examples. The unit "parts" used in connection with the examples and the comparative examples refers to "parts by mass", and the unit "%" used in connection with the examples and the comparative examples refers to "mass %" unless otherwise indicated. The properties of the composition were measured as described below.

3.1. Property Values of Polymer (1) Vinyl Bond Content and the Like

The vinyl bond content (1,2-bond content and 3,4-bond content) was calculated by infrared absorption spectrometry (Morello method). The unit of the vinyl bond content is "mol %". The total content of styrene units and p-methylstyrene units was calculated by infrared absorption spectrometry (Morello method) using a calibration curve. The unit of the styrene unit content is "mass %".

(2) Hydrogenation Rate

The hydrogenation rate was calculated from the $^1$H-NMR spectrum (solvent: carbon tetrachloride, 400 MHz).

(3) Weight Average Molecular Weight (Mw)

The weight average molecular weight (Mw) (polystyrene-equivalent weight average molecular weight) was determined by gel permeation chromatography (GPC) using a system "HLC-8120" manufactured by Tosoh Corporation.

Eluant: THF

Measurement temperature: 40° C.

Column: TSKgel GMHXL (4) Amino Group Content

The amino group content used herein refers to the number of amino groups per molecular chain of the polymer, and is calculated by the following expression.

Amino group content=(number of amino groups/molecular chain of polymer)

The amino group content was calculated using the following method. The amino group concentration (mol/g) was calculated by the amine titration method described in Analy. Chem. 564 (1952). Specifically, the resulting polymer was purified, and dissolved in an organic solvent, and HClO$_4$/CH$_3$COOH was titrated using methyl violet as an indicator until the color of the solution changed from purple to light blue to calculate the amino group concentration (mol/g). The amino group concentration (mol/g) was multiplied by the molecular weight (g/mol) to calculate the content (number) of amino groups per molecular chain of the polymer. Note that the molecular weight was calculated from the polystyrene-equivalent number average molecular weight determined by GPC.

3.2. Composition Property Measurement Methods and Evaluation Methods (1) Flexural Strength A formed article obtained by forming a composition in each example and comparative example was cut using a universal cutter so as to have a size of 10 mm×150 mm×1 mm (=width×length×thickness) to prepare a specimen. The test was performed in accordance with ISO 179 (distance between supports: 64 mm, testing speed: 2 mm/min). The test temperature was 23° C. The unit of the flexural strength is "MPa".

When the component (B) was used, a case in which the flexural strength was 250 MPa or more was determined to be satisfactory, and a case in which the flexural strength was less than 250 MPa was determined to be unsatisfactory.

When the component (B') was used, a case in which the flexural strength was 160 MPa or more was determined to be satisfactory, and a case in which the flexural strength was less than 160 MPa was determined to be unsatisfactory, because the impregnation of the non-woven fabric with a resin tended to be insufficient, and the strength tended to be decreased.

(2) Falling Weight Impact Strength

A formed article obtained by forming a composition in each example and comparative example was cut using a universal cutter so as to have a size of 80 mm×55 mm×1 mm (=width×length×thickness) to prepare a specimen. After that, the specimen was placed in a high-speed impact tester "HITS-P10" (model name) manufactured by Shimadzu Corporation, and subjected to a falling weight test (weight punch end diameter: 12.7 mm, receiver hole diameter: 43 mm, testing speed: 6.7 m/s, test temperature: 23° C.) to measure the puncture energy in accordance with JIS K 7211-2. The unit of the falling weight impact strength is "J".

When the component (B) was used, a case in which the falling weight impact strength was 20 J or more was determined to be satisfactory, and a case in which the falling weight impact strength was less than 20 J was determined to be unsatisfactory.

When the component (B') was used, a case in which the falling weight impact strength was 10 J or more was determined to be satisfactory, and a case in which the falling weight impact strength was less than 10 J was determined to be unsatisfactory, because the impregnation of the non-woven fabric with a resin tended to be insufficient, and the strength tended to be decreased.

(3) Interfacial Shear Strength

Interfacial shear strength was evaluated by a microdroplet method using a composite material interfacial property evaluation device (manufactured by Tohei Sangyo Co., Ltd., model number: "HM410"). More specifically, fibers to be measured were placed in the device, and a droplet of the thermoplastic resin (C) (see the tables for its type) that had been melted was formed on the fibers, followed by sufficient cooling at room temperature to obtain a measurement specimen. The measurement specimen was placed in the device again, and the droplet was sandwiched between the blades of the device. The measurement specimen was moved at a speed of 0.12 mm/min on the device to measure the maximum pull-out load F when the fibers were removed from the droplet. The interfacial shear strength tau was calculated using the following expression. A case in which the interfacial shear strength was 20 MPa or more was determined to be satisfactory, and a case in which the interfacial shear strength was less than 20 MPa was determined to be satisfactory.

$$tau=F/\pi DL$$

where,

F is the maximum stress (N) that occurs when the thermoplastic resin is removed from the carbon fibers, D is the diameter (m) of one carbon fiber, and L is the diameter (m) of the thermoplastic resin in the axial direction of the carbon fibers.

(4) External Appearance

<When Component (B) is Used>

At the time of the production of a film-like material (length: 30 cm, width: 19 cm, thickness: 80 micrometers), a 100 mm$^2$ surface (10 mm in length×10 mm in width) was observed using a microscope, and evaluation was performed in accordance with the following standard.

3 points: No void is observed, and resin impregnation is determined to be satisfactory.

2 points: The number of voids observed is 1 or more and less than 10, and resin impregnation is determined to be rather unsatisfactory.

1 point: The number of voids observed is 10 or more, and resin impregnation is determined to be unsatisfactory.

<When Component (B') is Used>

External appearance was evaluated in accordance with the following standard by observing the surface of a formed article with the naked eye.

3 points: The surface of the formed article is smooth, and has a gloss. The external appearance is determined to be satisfactory.

2 points: The surface of the formed article is found to have irregularities, but has a gloss. The external appearance is determined to be rather unsatisfactory.

1 point: The surface of the formed article is found to have many irregularities, and does not have a gloss. The external appearance is determined to be unsatisfactory.

(5) Volume Fraction of Reinforcing Fibers

The volume fraction of reinforcing fibers in a formed article was evaluated in accordance with JIS K 7075.

3.3. Production of Hydrogenation Catalyst

A hydrogenation catalyst was produced as described below.

A 1 L three-necked flask equipped with a stirrer and a dropping funnel in which the internal atmosphere had been replaced by dry nitrogen, was charged with 200 mL of anhydrous tetrahydrofuran and 0.2 mol of tetrahydrofurfuryl alcohol. After the dropwise addition of a solution (0.2 mol) of n-butyllithium (n-BuLi) in cyclohexane to the three-necked flask at 15° C., the mixture was reacted to obtain a solution of tetrahydrofurfuryloxylithium in tetrahydrofuran.

A 1 L three-necked flask equipped with a stirrer and a dropping funnel in which the internal atmosphere had been replaced by dry nitrogen, was charged with 49.8 g (0.2 mol) of bis(eta5-cyclopentadienyl)titanium dichloride and 250 mL of anhydrous tetrahydrofuran. The solution of tetrahydrofurfuryloxylithium in tetrahydrofuran obtained as described above was added dropwise to the mixture at room temperature over about 1 hour with stirring. When about 2 hours had elapsed, the resulting reddish brown liquid was filtered, and the insoluble part was washed with dichloromethane.

After combining the filtrate and the liquid obtained by washing, the solvent was removed under reduced pressure to obtain a hydrogenation catalyst (bis(eta5-cyclopentadienyl) titanium (tetrahydrofurfuryloxy)chloride (also referred to as "chlorobis(2,4-cyclopentadienyl)titanium(IV) tetrahydrofurfuryl alkoxide")). The yield was 95%.

3.4. Synthesis of Polymer (A) Including Amino Group

Synthesis Example 1

A reaction vessel (internal volume: 50 L) in which the internal atmosphere had been replaced by nitrogen, was charged with cyclohexane (25 kg), tetrahydrofuran (750 g), p-methylstyrene (750 g), and n-butyllithium (7.0 g), and the mixture was subjected to adiabatic polymerization from 50° C. After completion of the reaction, the temperature was adjusted to 20° C. After the addition of 1,3-butadiene (3,750 g), the mixture was subjected to adiabatic polymerization. When 30 minutes had elapsed from the initiation of adiabatic polymerization, p-methylstyrene (500 g) was added to the mixture, and the resulting mixture was subjected to polymerization. The mixture was reacted for 30 minutes under a hydrogen pressure of 1.0 MPa, and polymerization was terminated. After the addition of silicon tetrachloride (1.7 g), the hydrogenation catalyst (5.4 g) and diethylaluminum chloride (2.1 g) were added to the mixture when 15 minutes had elapsed from the addition of silicon tetrachloride, and the mixture was reacted for 1 hour under a hydrogen pressure of 1.0 MPa. After completion of the reaction, the reaction mixture was cooled to 70° C. (pressure: normal pressure), and removed from the reaction vessel to obtain a polymer solution. After the addition of water and the polymer solution to a solvent removal tank so that the ratio of water was 200 parts by mass based on 100 parts by mass of the polymer solution, the solvent was removed by steam stripping (steam temperature: 190° C.) for 2 hours in a state in which the temperature of the liquid phase contained in the solvent removal tank was 95° C., and the residue was dried using a heated roll that was controlled at 110° C. to obtain a hydrogenated conjugated diene block polymer (1-B). A 7 L separable flask equipped with a stirrer in which the internal atmosphere had been replaced by dry nitrogen, was charged with the conjugated diene block polymer (1-B) (500 g) and cyclohexane (4,000 g) to prepare a solution. After the addition of N,N,N',N'-tetramethylethylenediamine (13.8 g) and s-butyllithium (7.6 g), the mixture was stirred for 15 minutes. After the addition of N,N-bis(trimethylsilyl)aminopropylmethyldiethoxysilane (39.9 g), the mixture was reacted for 30 minutes. After evaporating the solvent using a rotary evaporator, the residue was dried at 60° C. for 18 hours under vacuum to obtain a polymer (1-D) including an amino group.

Synthesis Examples 2 and 5 to 7

A polymer (2-D) including an amino group, a polymer (5-D) including an amino group, a polymer (6-D) including an amino group, and a polymer (7-D) including an amino group were obtained in the same manner as in Synthesis Example 1, except that the components listed in Table 1 were used in the amounts listed in Table 1.

Synthesis Example 3

A reaction vessel (internal volume: 50 L) in which the internal atmosphere had been replaced by nitrogen, was charged with cyclohexane (25 kg), tetrahydrofuran (750 g), styrene (750 g), and n-butyllithium (7.0 g), and the mixture was subjected to adiabatic polymerization from 50° C. After completion of the reaction, the temperature was adjusted to 20° C. After the addition of 1,3-butadiene (3,750 g), the mixture was subjected to adiabatic polymerization. When 30 minutes had elapsed from the initiation of adiabatic polymerization, styrene (500 g) was added to the mixture, and the resulting mixture was reacted (polymerized) for 30 minutes. A solvent removal operation and a drying operation were performed in the same manner as in Synthesis Example 1 to obtain a polymer (3-A).

Synthesis Example 4

A reaction vessel (internal volume: 50 L) in which the internal atmosphere had been replaced by nitrogen, was charged with cyclohexane (25 kg), tetrahydrofuran (750 g), styrene (750 g), and n-butyllithium (7.0 g), and the mixture was subjected to adiabatic polymerization from 50° C. After completion of the reaction, the temperature was adjusted to 20° C. After the addition of 1,3-butadiene (3,750 g), the mixture was subjected to adiabatic polymerization. When 30 minutes had elapsed from the initiation of adiabatic polymerization, styrene (500 g) was added to the mixture, and the resulting mixture was subjected to polymerization. The mixture was reacted for 30 minutes under a hydrogen pressure of 1.0 MPa, and polymerization was terminated. After the addition of silicon tetrachloride (1.7 g), the hydrogenation catalyst (5.4 g) and diethylaluminum chloride (2.1 g) were added to the mixture when 15 minutes had elapsed from the addition of silicon tetrachloride, and the mixture was reacted for 1 hour under a hydrogen pressure of 1.0 MPa. After completion of the reaction, the reaction mixture was cooled to 70° C. (pressure: normal pressure), and removed from the reaction vessel to obtain a polymer solution. A solvent removal operation and a drying operation were performed in the same manner as in Synthesis Example 1 to obtain a hydrogenated polymer (4-B).

The reagents used for the reaction for producing each copolymer, and analysis results are listed in Table 1.

STAB AO-60", manufactured by Adeka Corporation), and 0.1 parts by mass of tris(2,4-di-tert-butylphenyl)phosphite (trade name: "ADK STAB 2112", manufactured by Adeka Corporation) serving as antioxidants were added to the component (A) and the component (C) (see Table 2 for their types and numbers of parts by mass), and the mixture was manually blended at room temperature. The mixture was melt-mixed using a twin-screw extruder "TEM26SS" (model name) manufactured by Toshiba Machine Co., Ltd. to obtain pellets. Note that the cylinder temperature during melt-mixing was set so that the temperature around the base of the hopper was 140° C., and the temperature around the outlet was 220° C. (i.e., a temperature gradient of 140° C. to 220° C. was formed). After sufficiently drying the pellets, a film having a thickness of 50 micrometers was prepared using a twin-screw extruder "KZW15-30MG" (model name) manufactured by Technovel Corporation, in which

TABLE 1

| | | Synthesis Example 1 | Synthesis Example 2 | Synthesis Example 3 | Synthesis Example 4 | Synthesis Example 5 | Synthesis Example 6 | Synthesis Example 7 |
|---|---|---|---|---|---|---|---|---|
| Cyclohexane | g | 25,000 | 25,000 | 25,000 | 25,000 | 25,000 | 25,000 | 25,000 |
| Tetrahydrofuran (added prior to initiation of polymerization) | g | 750 | 750 | 750 | 750 | 750 | 750 | 750 |
| Styrene (first stage) | g | | | 750 | 750 | | | |
| p-Methylstyrene (first stage) | g | 750 | 750 | | | 750 | 750 | 750 |
| n-Butyllithium | g | 7.0 | 7.0 | 7.0 | 7.0 | 7.0 | 7.0 | 7.0 |
| Tetrahydrofuran (added after completion of first-stage polymerization) | g | | | | | | | |
| 1,3-Butadiene (second stage) | g | 3,750 | 3,750 | 3,750 | 3,750 | 3,750 | 3,750 | 3,750 |
| Styrene (third stage) | g | | | 500 | 500 | | | |
| p-Methylstyrene (third stage) | g | 500 | 500 | | | 500 | 500 | 500 |
| (Hydrogenation reaction) | | | | | | | | |
| Silicon tetrachloride | g | 1.7 | 1.7 | | 1.7 | 1.7 | 1.7 | 1.7 |
| Hydrogenation catalyst | g | 5.4 | 5.4 | | 5.4 | 5.4 | 5.4 | 5.4 |
| Diethylaluminum chloride | g | 2.1 | 2.1 | | 2.1 | 2.1 | 2.1 | 2.1 |
| (Modification reaction) | | | | | | | | |
| Polymer | g | 500 | 500 | | | 500 | 500 | 500 |
| Cyclohexane | g | 4,000 | 4,000 | | | 4,000 | 4,000 | 4,000 |
| TMEDA | g | 13.8 | 13.8 | | | 13.8 | 13.8 | 13.8 |
| s-Butyllithium | g | 7.6 | 7.6 | | | 7.6 | 7.6 | 7.6 |
| N,N-Bis(trimethylsilyl)aminopropylmethyldiethoxysilane | g | 39.9 | | | | | | |
| N,N-Bis(trimethylsilyl)aminopropyldimethylmethoxysilane | g | | 34.7 | | | | | |
| 3-Morpholinopropyldimethylmethoxysilane | g | | | | | 25.9 | | |
| N-(3-Chloropropyl)morpholine | g | | | | | | 19.5 | |
| 3-(4-Methylpiperazin-1-yl)propyldimethylmethoxysilane | g | | | | | | | 27.4 |
| (Analysis results) | | | | | | | | |
| Polymer No. | | 1-D | 2-D | 3-A | 4-B | 5-D | 6-D | 7-D |
| Vinyl bond content | % | 78 | 78 | 81 | 78 | 78 | 78 | 78 |
| Total content of styrene and p-methylstyrene units | % | 25 | 25 | 25 | 25 | 25 | 25 | 25 |
| Hydrogenation rate | % | 98 | 98 | — | 98 | 98 | 98 | 98 |
| Weight average molecular weight | ×10,000 | 8.7 | 9 | 9 | 10 | 9 | 9 | 9 |
| Amino group content | number of amino acid groups/chain | 10 | 10 | — | — | 10 | 10 | 20 |

3.5. Production of Formed Article (1)

In each of Examples 1 to 4 and Comparative Examples 1 to 4, a formed article produced from a film-like material obtained by impregnating the component (B) with a mixture including the component (A) and the component (C) was evaluated.

Example 1

0.1 parts by mass of pentaerythritol tetrakis[3-(3,5-di-tert-butyl-4-hydroxyphenyl)propionate] (trade name: "ADK the cylinder temperature was set so that a temperature gradient of 140° C. to 220° C. was formed in the same manner as above, and a T-die. The prepared film was cut so as to have a size of 30 cm×19 cm to prepare films for pressing.

On one of the prepared films for pressing, carbon fibers serving as the component (B) (manufactured by Toray Industries Inc., product number: "T700SC-12K-50C", having a bundle shape in which 12,000 filaments each having a diameter of about 7 micrometers were bundled) were arranged in a size of 30 cm×19 cm and laminated. The other of the prepared films for pressing was further stacked and arranged thereon. The laminate thus prepared was subjected to hot press forming at 190° C. and a pressure of 3 MPa to produce a film-like formed article (length: 30 cm, width: 19 cm, thickness: 80 micrometers) in which the volume fraction (in accordance with JIS K 7075) of the reinforcing fibers was 28% and which was formed from the composition listed in Table 2.

The produced film-like formed article was cut, and fourteen pieces thereof were laminated so that fiber directions formed an angle of 90° with each other. The laminate was subjected to hot press forming at 190° C. and a pressure of 10 MPa to obtain a formed article A1 having a length of 15 cm, a width of 15 cm, and a thickness of 1 mm.

Examples 2, 3, and 5 to 7, and Comparative Examples 1 and 4

Formed articles A2, A3, A5, A6, A7, A8, and A11 each having a length of 15 cm, a width of 15 cm, and a thickness of 1 mm were obtained by forming using the same method as in Example 1, except that the thickness of each of the films for pressing was changed to 40 micrometers, and the volume fraction (in accordance with JIS K 7075) of the reinforcing fibers was changed to 33%.

Example 4

A formed article A4 having a length of 15 cm, a width of 15 cm, and a thickness of 1 mm was obtained by forming using the same method as in Example 1, except that the thickness of each of the films for pressing was changed to 30 micrometers, and the volume fraction (in accordance with JIS K 7075) of the reinforcing fibers was changed to 53%.

Comparative Example 2

A formed article A9 having a length of 15 cm, a width of 15 cm, and a thickness of 1 mm was obtained by forming using the same method as in Example 1, except that the thickness of each of the films for pressing was changed to 25 micrometers, and the volume fraction (in accordance with JIS K 7075) of the reinforcing fibers was changed to 63%.

Comparative Example 3

A formed article A10 having a length of 15 cm, a width of 15 cm, and a thickness of 1 mm was obtained by forming using the same method as in Example 1, except that the thickness of each of the films for pressing was changed to 60 micrometers, and the volume fraction (in accordance with JIS K 7075) of the reinforcing fibers was changed to 20%.

Comparative Example 5

0.1 parts by mass of pentaerythritol tetrakis[3-(3,5-di-tert-butyl-4-hydroxyphenyl)propionate] (trade name: "ADK STAB AO-60", manufactured by Adeka Corporation), and 0.1 parts by mass of tris(2,4-di-tert-butylphenyl)phosphite (trade name: "ADK STAB 2112", manufactured by Adeka Corporation) serving as antioxidants, and 1 part by mass of an acid-modified polypropylene (trade name: "UMEX 1001", manufactured by Sanyo Chemical Industries, Ltd.) instead of the component (A) were added to the component (C) (see Table 2 for their types and numbers of parts by mass), and the mixture was dry-blended at room temperature. The mixture was melt-mixed using a twin-screw extruder "TEM26SS" (model name) manufactured by Toshiba Machine Co., Ltd. to obtain pellets. Note that the cylinder temperature during melt-mixing was set so that the temperature around the base of the hopper was 140° C., and the temperature around the outlet was 220° C. (i.e., a temperature gradient of 140° C. to 220° C. was formed). After sufficiently drying the pellets, a film having a thickness of 50 micrometers was prepared using a twin-screw extruder "KZW15-30MG" (model name) manufactured by Technovel Corporation, in which the cylinder temperature was set so that a temperature gradient of 140° C. to 220° C. was formed in the same manner as above, and a T-die. The prepared film was cut so as to have a size of 30 cm×19 cm to prepare two films for pressing. A formed article A12 having a length of 15 cm, a width of 15 cm, and a thickness of 1 mm was obtained by forming using the same method as in Example 1, except that the thickness of each of the films for pressing was changed to 40 micrometers, and the volume fraction (in accordance with JIS K 7075) of the reinforcing fibers was changed to 33%.

<Evaluation Results>

The composition of each example and comparative example, and the evaluation results are listed in Table 2.

TABLE 2

| | | Example 1 | Example 2 | Example 3 | Example 4 | Example 5 | Example 6 | Example 7 |
|---|---|---|---|---|---|---|---|---|
| Polymer (A) | Type | 1-D | 1-D | 2-D | 2-D | 5-D | 6-D | 7-D |
| | Parts by mass | 0.5 | 1 | 2 | 4 | 2 | 1 | 3 |
| Fibers (B) | Type | B-1 | B-1 | B-1 | B-1 | B-1 | B-1 | B-1 |
| | Parts by mass | 75 | 100 | 100 | 230 | 100 | 100 | 100 |
| Thermoplastic resin (C) | Type | PP | PP | PP | PP | PP | PP | PP |
| | Parts by mass | 100 | 100 | 100 | 100 | 100 | 100 | 100 |
| Type of formed article | | A1 | A2 | A3 | A4 | A5 | A6 | A7 |
| Volume fraction of reinforcing fibers | % | 28 | 33 | 33 | 53 | 33 | 33 | 33 |
| Evaluation results | | | | | | | | |
| Flexural strength | MPa | 280 | 310 | 330 | 350 | 320 | 330 | 320 |
| | Quality judgment | Satisfactory | Satisfactory | Satisfactory | Satisfactory | Satisfactory | Satisfactory | Satisfactory |
| Falling weight impact strength | J | 23 | 32 | 30 | 43 | 33 | 30 | 31 |
| | Quality judgment | Satisfactory | Satisfactory | Satisfactory | Satisfactory | Satisfactory | Satisfactory | Satisfactory |
| External appearance | point | 3 | 3 | 3 | 3 | 3 | 3 | 3 |
| | Quality judgment | Satisfactory | Satisfactory | Satisfactory | Satisfactory | Satisfactory | Satisfactory | Satisfactory |

TABLE 2-continued

|  |  | Comparative Example 1 | Comparative Example 2 | Comparative Example 3 | Comparative Example 4 | Comparative Example 5 |
|---|---|---|---|---|---|---|
| Polymer (A) | Type | — | 4-B | 3-A | 4-B | — |
|  | Parts by mass | 0 | 2 | 2 | 2 | 0 |
| Fibers (B) | Type | B-1 | B-1 | B-1 | B-1 | B-1 |
|  | Parts by mass | 100 | 340 | 50 | 100 | 100 |
| Thermoplastic resin (C) | Type | PP | PP | PP | PP | PP |
|  | Parts by mass | 100 | 100 | 100 | 100 | 100 |
| Type of formed article |  | A8 | A9 | A10 | A11 | A12 |
| Volume fraction of reinforcing fibers | % | 33 | 63 | 20 | 33 | 33 |
| Evaluation results |  |  |  |  |  |  |
| Flexural strength | MPa | 180 | 280 | 190 | 210 | 230 |
|  | Quality judgment | Unsatisfactory | Satisfactory | Unsatisfactory | Unsatisfactory | Unsatisfactory |
| Falling weight impact strength | J | 11 | 13 | 11 | 13 | 16 |
|  | Quality judgment | Unsatisfactory | Unsatisfactory | Unsatisfactory | Unsatisfactory | Unsatisfactory |
| External appearance | point | 2 | 1 | 2 | 2 | 1 |
|  | Quality judgment | Rather unsatisfactory | Unsatisfactory | Rather unsatisfactory | Rather unsatisfactory | Unsatisfactory |

The details of the component (B) and the component (C) listed in Table 2 are as follows.

<Fibers (B)>

B-1: "T700SC-12K-50C" (product number) manufactured by Toray Industries Inc., having a bundle shape in which 12,000 filaments each having a diameter of about 7 micrometers are bundled.

<Thermoplastic Resin (C)>

PP: Polypropylene "NOVATEC MA1B" (trade name) manufactured by Japan Polypropylene Corporation According to Examples 1 to 7, it was found that the flexural strength and the falling weight impact strength were greatly improved as compared to those obtained in Comparative Example 1 in which the component (A) was not used. In Examples 1 to 7, the impregnation of the component (B) with the resin was sufficient, and hence no void was observed on the surface of the formed article.

According to Comparative Example 1 in which the component (A) was not used, it was found that the flexural strength and the falling weight impact strength, and the external appearance were inferior to those obtained in the examples.

According to Comparative Example 2 in which the component (A) did not include an amino group and the content ratio of the component (B) was excessively high, it was found that the component (B) and the component (C) were not able to be strongly bonded to each other in the resulting formed article, and the falling weight impact strength was hardly improved even as compared to that obtained in Comparative Example 1 in which the component (A) was not used. Owing to the excessively high content ratio of the component (B), the impregnation with the resin was insufficient, and many voids were observed on the surface of the formed article.

According to Comparative Example 3 in which the component (A) did not include an amino group and the content ratio of the component (B) was excessively low, it was found that the flexural strength and the falling weight impact strength were hardly improved even as compared to those obtained in Comparative Example 1 in which the component (A) was not used.

According to Comparative Example 4 in which the component (A) did not include an amino group, it was found that the component (B) and the component (C) were not able to be strongly bonded to each other in the resulting formed article, and the flexural strength and the falling weight impact strength were hardly improved even as compared to those obtained in Comparative Example 1 in which the component (A) was not used.

According to Comparative Example 5 in which the component (A) was not used, the component (B) and the component (C) were not able to be strongly bonded to each other in the resulting formed article, the flexural strength and the falling weight impact strength were inferior to those obtained in the examples, and many voids were observed on the surface of the formed article.

3.6. Production of Formed Article (2)

In each of Examples 8 to 14, and Comparative Examples 6 to 8 and Comparative Example 10, a formed article produced from a film-like material obtained by impregnating the component (B') with a mixture including the component (A) and the component (C) was evaluated.

<Production of Non-Woven Fabric>

A production method for non-woven fabrics (B'-1) to (B'-3) was as described below. "T700SC-12K-50C" (product number, density: 1.80 g/cm$^3$) manufactured by Toray Industries Inc. was cut using a cartridge cutter to obtain chopped strands having fiber lengths of 6 mm, 10 mm, and 40 mm, respectively. 100 L of a 1.5 wt % aqueous solution of "sodium n-dodecylbenzenesulfonate" (product name) manufactured by Wako Pure Chemical Industries, Ltd. was stirred to produce a dispersion in which bubbles had been formed in advance. The obtained chopped strands were charged into the dispersion, and the mixture was stirred for 10 minutes. After that, the mixture was poured into a paper-making machine having a paper-making surface, and dehydrated by suction, followed by drying at a temperature of 150° C. for 2 hours to obtain each of the non-woven fabrics (B'-1) to (B'-3). The non-woven fabric (B'-1) is a non-woven fabric obtained from the chopped strand having a fiber length of 6 mm, the non-woven fabric (B'-2) is a non-woven fabric obtained from the chopped strand having a fiber length of 10 mm, and the non-woven fabric (B'-3) is a non-woven fabric obtained from the chopped strand having a fiber length of 40 mm.

A production method for a non-woven fabric (B'-4) (non-woven fabric formed of recycled carbon fibers) is as described below. A formed article obtained in Comparative Example 6 described later was sandwiched with 300-meshes from both sides, and then loaded into a crucible at a loading ratio of 80 vol %, followed by decomposition by heating under a cracker gas-filled state using an electric furnace at 400° C. for 1 hour to obtain recycled carbon fibers having an average fiber diameter of 7 micrometers and an average fiber length of 4 mm. 100 L of a 1.5 wt % aqueous solution of "sodium n-dodecylbenzenesulfonate" (product name) manufactured by Wako Pure Chemical Industries, Ltd. was stirred to produce a dispersion in which bubbles had been formed in advance. The obtained recycled carbon fibers were charged into the dispersion, and the mixture was stirred for 10 minutes. After that, the mixture was poured into a paper-making machine having a paper-making surface, and dehydrated by suction, followed by drying at a temperature of 150° C. for 2 hours to obtain the non-woven fabric (B'-4) formed of recycled carbon fibers.

Example 8

0.1 parts by mass of pentaerythritol tetrakis[3-(3,5-di-tert-butyl-4-hydroxyphenyl)propionate] (trade name: "ADK STAB AO-60", manufactured by Adeka Corporation), and 0.1 parts by mass of tris(2,4-di-tert-butylphenyl)phosphite (trade name: "ADK STAB 2112", manufactured by Adeka Corporation) serving as antioxidants were added to the component (A) and the component (C) (see Table 3 for their types and numbers of parts by mass), and the mixture was manually blended at room temperature. The mixture was melt-mixed using a twin-screw extruder "TEM26SS" (model name) manufactured by Toshiba Machine Co., Ltd. to obtain pellets. Note that the cylinder temperature during melt-mixing was set so that the temperature around the base of the hopper was 140° C., and the temperature around the outlet was 220° C. (i.e., a temperature gradient of 140° C. to 220° C. was formed). After sufficiently drying the pellets, a film having a thickness of 100 micrometers was prepared using a twin-screw extruder "KZW15-30MG" (model name) manufactured by Technovel Corporation, in which the cylinder temperature was set so that a temperature gradient of 140° C. to 220° C. was formed in the same manner as above, and a T-die. The prepared film was cut so as to have a size of 15 cm×15 cm to prepare films for pressing.

On one of the prepared films for pressing, a non-woven fabric (B'-1) serving as the component (B') was arranged in a size of 15 cm×15 cm and laminated. The other of the prepared films for pressing was further stacked and arranged thereon. The laminate thus prepared was subjected to hot press forming at 190° C. and a pressure of 3 MPa to produce a film-like formed article (length: 15 cm, width: 15 cm, thickness: 200 micrometers) in which the volume fraction (in accordance with JIS K 7075) of the reinforcing fibers was 33% and which was formed from the composition listed in Table 3.

Six film-like formed articles thus produced were laminated, and subjected to hot press forming at 190° C. and a pressure of 10 MPa to obtain a formed article A13 having a length of 15 cm, a width of 15 cm, and a thickness of 1 mm.

Examples 9 to 14, and Comparative Examples 6 and 10

Formed articles A14 to A20 and A24 each having a length of 15 cm, a width of 15 cm, and a thickness of 1 mm were obtained by forming using the same method as in Example 8, except that the component (A) and the component (B') were changed to those listed in Table 3.

Comparative Example 7

A formed article A21 having a length of 15 cm, a width of 15 cm, and a thickness of 1 mm was obtained by forming using the same method as in Example 8, except that the component (A) was changed to one listed in Table 3, the component (B') was changed to the non-woven fabric (B'-2), and the thickness of the film produced using a T-die was changed to 50 micrometers.

Comparative Example 8

A formed article A22 having a length of 15 cm, a width of 15 cm, and a thickness of 1 mm was obtained by forming using the same method as in Example 8, except that the component (A) was changed to one listed in Table 3, the component (B') was changed to the non-woven fabric (B'-3), and the thickness of the film produced using a T-die was changed to 150 micrometers.

Comparative Examples 9 and 11

0.1 parts by mass of pentaerythritol tetrakis[3-(3,5-di-tert-butyl-4-hydroxyphenyl)propionate] (trade name: "ADK STAB AO-60", manufactured by Adeka Corporation), and 0.1 parts by mass of tris(2,4-di-tert-butylphenyl)phosphite (trade name: "ADK STAB 2112", manufactured by Adeka Corporation) serving as antioxidants, and 3 parts by mass of an acid-modified polypropylene (trade name: "UMEX 1001", manufactured by Sanyo Chemical Industries, Ltd.) instead of the component (A) were added to the component (C) (see Table 3 for their types and numbers of parts by mass), and the mixture was dry-blended at room temperature. The mixture was melt-mixed using a twin-screw extruder "TEM26SS" (model name) manufactured by Toshiba Machine Co., Ltd. to obtain pellets. Note that the cylinder temperature during melt-mixing was set so that the temperature around the base of the hopper was 140° C., and the temperature around the outlet was 220° C. (i.e., a temperature gradient of 140° C. to 220° C. was formed). After sufficiently drying the pellets, a film having a thickness of 100 micrometers was prepared using a twin-screw extruder "KZW15-30MG" (model name) manufactured by Technovel Corporation, in which the cylinder temperature was set so that a temperature gradient of 140° C. to 220° C. was formed in the same manner as above, and a T-die. The prepared film was cut so as to have a size of 15 cm×15 cm to prepare two films for pressing. Formed articles A23 and A25 each having a length of 15 cm, a width of 15 cm, and a thickness of 1 mm were obtained by forming using the non-woven fabrics (B'-1) and (B'-4), respectively, by the same method as in Example 8.

<Evaluation Results>

The composition of each example and comparative example, and the evaluation results are listed in Table 3.

TABLE 3

|  |  | Example 8 | Example 9 | Example 10 | Example 11 | Example 12 | Example 13 | Example 14 |
|---|---|---|---|---|---|---|---|---|
| Polymer (A) | Type | 1-D | 1-D | 2-D | 5-D | 6-D | 7-D | 2-D |
|  | Parts by mass | 6 | 1 | 5 | 2 | 3 | 3 | 4 |
| Non-woven fabric (B') | Type | B'-1 | B'-2 | B'-3 | B'-1 | B'-2 | B'-3 | B'-4 |
|  | Fiber length (mm) | 6 | 10 | 40 | 6 | 10 | 40 | 6 |
|  | Mass per unit area (g/m2) | 180 | 130 | 100 | 180 | 130 | 100 | 180 |
|  | Parts by mass | 56 | 80 | 62 | 111 | 80 | 62 | 111 |
| Thermoplastic resin (C) | Type | PP | PP | PP | PP | PP | PP | PP |
|  | Parts by mass | 100 | 100 | 100 | 100 | 100 | 100 | 100 |
| Type of formed article |  | A13 | A14 | A15 | A16 | A17 | A18 | A19 |
| Volume fraction (%) of reinforcing fibers |  | 33 | 27 | 22 | 33 | 27 | 22 | 33 |
| Evaluation results |  |  |  |  |  |  |  |  |
| Flexural strength | MPa | 230 | 190 | 176 | 234 | 201 | 180 | 214 |
|  | Quality judgment | Satisfactory | Satisfactory | Satisfactory | Satisfactory | Satisfactory | Satisfactory | Satisfactory |
| Falling weight impact strength | J | 12 | 13 | 12 | 15 | 14 | 13 | 14 |
|  | Quality judgment | Satisfactory | Satisfactory | Satisfactory | Satisfactory | Satisfactory | Satisfactory | Satisfactory |
| External appearance | points | 3 | 3 | 3 | 3 | 3 | 3 | 3 |
|  | Quality judgment | Satisfactory | Satisfactory | Satisfactory | Satisfactory | Satisfactory | Satisfactory | Satisfactory |

|  |  | Comparative Example 6 | Comparative Example 7 | Comparative Example 8 | Comparative Example 9 | Comparative Example 10 | Comparative Example 11 |
|---|---|---|---|---|---|---|---|
| Polymer (A) | Type | — | 3-A | 4-B | — | — | — |
|  | Parts by mass | 0 | 3 | 6 | 0 | 0 | 0 |
| Non-woven fabric (B') | Type | B'-1 | B'-2 | B'-3 | B'-1 | B'-4 | B'-4 |
|  | Fiber length (mm) | 6 | 10 | 40 | 6 | 6 | 6 |
|  | Mass per unit area (g/m2) | 180 | 130 | 100 | 180 | 180 | 180 |
|  | Parts by mass | 111 | 160 | 41 | 111 | 111 | 111 |
| Thermoplastic resin (C) | Type | PP | PP | PP | PP | PP | PP |
|  | Parts by mass | 100 | 100 | 100 | 100 | 100 | 100 |
| Type of formed article |  | A20 | A21 | A22 | A23 | A24 | A25 |
| Volume fraction (%) of reinforcing fibers |  | 33 | 42 | 16 | 33 | 33 | 33 |
| Evaluation results |  |  |  |  |  |  |  |
| Flexural strength | MPa | 120 | 164 | 95 | 144 | 116 | 138 |
|  | Quality judgment | Unsatisfactory | Satisfactory | Unsatisfactory | Unsatisfactory | Unsatisfactory | Unsatisfactory |
| Falling weight impact strength | J | 4 | 5 | 5 | 4 | 4 | 4 |
|  | Quality judgment | Unsatisfactory | Unsatisfactory | Unsatisfactory | Unsatisfactory | Unsatisfactory | Unsatisfactory |
| External appearance | points | 2 | 1 | 1 | 1 | 2 | 1 |
|  | Quality judgment | Rather unsatisfactory | Unsatisfactory | Unsatisfactory | Unsatisfactory | Rather unsatisfactory | Unsatisfactory |

The detail of the component (C) listed in Table 3 is as follows.

<Thermoplastic Resin (C)>

PP: Polypropylene "NOVATEC MA1B" (trade name) manufactured by Japan Polypropylene Corporation According to Examples 8 to 14, it was found that the flexural strength and the falling weight impact strength were greatly improved as compared to those obtained in Comparative Example 6 in which the component (A) was not used. In Examples 8 to 14, the impregnation of the component (B') with the resin was sufficient, and hence it was observed that the surface was smooth, and had a gloss.

According to Comparative Examples 6 to 10 in which the component (A) was not used, it was found that the flexural strength and the falling weight impact strength, and the external appearance were inferior to those obtained in the examples.

According to Comparative Example 7 in which the component (A) did not include an amino group, it was found that the component (B') and the component (C) were not able to be strongly bonded to each other in the resulting formed article, and the falling weight impact strength was hardly improved even as compared to that obtained in Comparative Example 6 in which the component (A) was not used.

According to Comparative Example 8 in which the component (A) did not include an amino group, it was found that the flexural strength and the falling weight impact strength were hardly improved even as compared to those obtained in Comparative Example 6 in which the component (A) was not used.

According to Comparative Examples 9 and 11 in which the acid-modified propylene including no amino group was used instead of the component (A), the component (B') and the component (C) were not able to be strongly bonded to each other in the resulting formed article, the flexural strength and the falling weight impact strength were inferior to those obtained in the examples, and many irregularities were observed on the surface of the formed article.

3.7. Production of Formed Article (3)

In each of Examples 15 and 16, and Comparative Examples 12 to 14, a formed article produced from a film-like material obtained by applying a sizing agent including the component (A) to the component (B) was evaluated.

<Preparation of Sizing Agent>

A conical flask was charged with 100 g of the polymer (A) listed in Table 4 and 900 g of cyclohexane, and the polymer (A) was dissolved in cyclohexane at room temperature to prepare a solution including the polymer (A). A 2 L glass beaker was charged sequentially with 350 g of water, 640 g of the solution prepared as described above, and 25.6 g of a 25% aqueous solution including Emulgen 147 (trade name, polyoxyethylene lauryl ether) manufactured by Kao Corporation, and the mixture was stirred at 13,000 rpm for 10 minutes using a homomixer "MARK II" (trade name) manufactured by PRIMIX Corporation. The mixture was transferred to a rotary evaporator "N-11" (trade name) manufactured by Tokyo Rikakikai Co., Ltd., and cyclohexane was removed to obtain each aqueous emulsified dispersion (sizing agent) having a concentration of the polymer (A) adjusted to 7%. Note that the average particle size of the polymer (A) was determined as an average particle size D50 from a particle size distribution obtained by measuring the particle size distribution of the aqueous emulsified dispersion (sizing agent) obtained above using a dynamic light-scattering particle size distribution-measuring device (manufactured by Otsuka Electronics Co., Ltd., type: "FPAR-1000").

Carbon fibers B-0 ("TORAYCA T700SC-12000-50C" (trade name) manufactured by Toray Industries Inc. from which the sizing agent had been removed using acetone) were continuously immersed in a treatment bath filled with the prepared aqueous emulsified dispersion (sizing agent) so that a predetermined amount of the polymer (A) including an amino group adhered to the fibers (B). The fibers were subsequently dried in an oven at 120° C. for 5 minutes. The resulting fibers (B) to which the polymer (A) including an amino group adhered were subjected to the above-mentioned interfacial shear strength measurement, and used for producing a carbon fiber film.

Examples 15 and 16, and Comparative Examples 13 and 14

0.1 parts by mass of pentaerythritol tetrakis[3-(3,5-di-tert-butyl-4-hydroxyphenyl)propionate] (trade name: "ADK STAB AO-60", manufactured by Adeka Corporation), and 0.1 parts by mass of tris(2,4-di-tert-butylphenyl)phosphite (trade name: "ADK STAB 2112", manufactured by Adeka Corporation) serving as antioxidants were added to the component (C) (see Table 4 for their types and numbers of parts by mass), and the mixture was manually blended at room temperature. Then, a film having a thickness of 40 micrometers was prepared from the mixture using a twin-screw extruder "KZW15-30MG" (model name) manufactured by Technovel Corporation, in which the cylinder temperature was set so that a temperature gradient of 140° C. to 220° C. was formed, and a T-die. The prepared film was cut so as to have a size of 30 cm×19 cm to prepare two films for pressing.

Formed articles B1, B2, B4, and B5 each having a length of 15 cm, a width of 15 cm, and a thickness of 1 mm were obtained in the same manner as in Example 1 described above, except that the prepared films for pressing, and the carbon fiber film prepared using the fibers (B) to which the polymer (A) including an amino group adhered were used.

Comparative Example 12

A formed article B3 having a length of 15 cm, a width of 15 cm, and a thickness of 1 mm was obtained in the same manner as in Example 15, except that the carbon fibers B-0 were used as they were without the application of the sizing agent including the component (A), and the component (C) listed in Table 4 was used.

<Evaluation Results>

The composition of each example and comparative example, and the evaluation results are listed in Table 4.

TABLE 4

| | | Example 15 | Example 16 | Comparative Example 12 | Comparative Example 13 | Comparative Example 14 |
|---|---|---|---|---|---|---|
| Composition of sizing agent | | | | | | |
| Polymer (A) | Type | 1-D | 2-D | — | 3-A | 4-B |
| Average particle size of polymer (A) | micrometers | 1.5 | 0.6 | — | 1.2 | 1.3 |
| Content of polymer (A) | mass % | 7 | 7 | — | 7 | 7 |
| Adhesion of polymer (A) | mass % | 2 | 2 | — | 1.2 | 1.5 |
| Polymer (A) | parts by mass | 2 | 2 | 0 | 1.2 | 1.5 |
| Fibers (B) | parts by mass | 100 | 100 | 100 | 100 | 100 |
| Thermoplastic resin (C) | Type | PP | PP | PP | PP | PP |
| | parts by mass | 100 | 100 | 100 | 100 | 100 |
| Type of formed article | | B1 | B2 | B3 | B4 | B5 |
| Volume fraction of reinforcing fibers | % | 33 | 33 | 33 | 33 | 33 |
| Evaluation results | | | | | | |
| Interfacial shear strength | MPa | 30 | 35 | 7 | 11 | 12 |
| | Quality judgment | Satisfactory | Satisfactory | Unsatisfactory | Unsatisfactory | Unsatisfactory |
| Flexural strength | MPa | 320 | 340 | 190 | 190 | 210 |
| | Quality judgment | Satisfactory | Satisfactory | Unsatisfactory | Unsatisfactory | Unsatisfactory |

TABLE 4-continued

|  |  | Example 15 | Example 16 | Comparative Example 12 | Comparative Example 13 | Comparative Example 14 |
|---|---|---|---|---|---|---|
| Falling weight impact strength | J | 36 | 37 | 13 | 15 | 14 |
|  | Quality judgment | Satisfactory | Satisfactory | Unsatisfactory | Unsatisfactory | Unsatisfactory |
| External appearance | points | 3 | 3 | 2 | 2 | 2 |
|  | Quality judgment | Satisfactory | Satisfactory | Rather satisfactory | Rather satisfactory | Rather satisfactory |

The detail of the component (C) listed in Table 4 is as follows.
<Thermoplastic Resin (C)>
PP: Polypropylene "NOVATEC MA1B" (trade name) manufactured by Japan Polypropylene Corporation According to Examples 15 and 16, it was found that the interfacial shear strength, the flexural strength, the falling weight impact strength, and the external appearance were greatly improved as compared to those obtained in Comparative Example 12 in which the component (A) was not used. In Examples 15 and 16, the impregnation of the component (B) with the resin was sufficient, and hence no void was observed on the surface of the formed article.

According to Comparative Example 12 in which the component (A) was not used, it was found that the interfacial shear strength, the flexural strength, the falling weight impact strength, and the external appearance were inferior to those obtained in the examples.

According to Comparative Examples 13 and 14 in which the component (A) did not include an amino group, it was found that the component (B) and the component (C) were not able to be strongly bonded to each other in the resulting formed article, and the interfacial shear strength, the flexural strength, and the falling weight impact strength were hardly improved even as compared to those obtained in Comparative Example 12 in which the component (A) was not used.

3.8. Production of Formed Article (4)

In each of Examples 17 to 21, and Comparative Examples 15 to 19, a formed article produced from a film-like material obtained by applying the sizing agent including the component (A) prepared above to the component (B') was evaluated.
<Production of Non-Woven Fabric>
"T700SC-12K-50C" (product number) manufactured by Toray Industries Inc. was immersed in acetone to remove the sizing agent, and then cut using a cartridge cutter to obtain chopped strands having fiber lengths of 6 mm, 10 mm, and 40 mm, respectively. 100 L of a 1.5 wt % aqueous solution of "sodium n-dodecylbenzenesulfonate" (product name) manufactured by Wako Pure Chemical Industries, Ltd. was stirred to produce a dispersion in which bubbles had been formed in advance. The obtained chopped strands were charged into the dispersion, and the mixture was stirred for 10 minutes. After that, the mixture was poured into a paper-making machine having a paper-making surface, and dehydrated by suction, followed by drying at a temperature of 150° C. for 2 hours to obtain each of the non-woven fabrics (B'-5), (B'-6), and (B'-7). The non-woven fabric (B'-5) is a non-woven fabric obtained from the chopped strand having a fiber length of 6 mm, the non-woven fabric (B'-6) is a non-woven fabric obtained from the chopped strand having a fiber length of 10 mm, and the non-woven fabric (B'-7) is a non-woven fabric obtained from the chopped strand having a fiber length of 40 mm.

A non-woven fabric (B'-8) was obtained in the same manner as in the above-mentioned method, except that the non-woven fabric (B'-4) (non-woven fabric formed of recycled carbon fibers) was used.

Example 17

The non-woven fabric (B'-5) was immersed in a treatment bath filled with the prepared aqueous emulsified dispersion (sizing agent) so that a predetermined amount of the polymer (1-D) adhered to the non-woven fabric (B'-5). The resultant was subsequently dried in an oven at 120° C. for 5 minutes to produce the non-woven fabric (B'-5) to which the polymer (1-D) adhered.

Next, 0.1 parts by mass of pentaerythritol tetrakis[3-(3, 5-di-tert-butyl-4-hydroxyphenyl)propionate] (trade name: "ADK STAB AO-60", manufactured by Adeka Corporation), and 0.1 parts by mass of tris(2,4-di-tert-butylphenyl) phosphite (trade name: "ADK STAB 2112", manufactured by Adeka Corporation) serving as antioxidants were added to the component (C) (see Table 5 for their types and numbers of parts by mass), and the mixture was manually blended at room temperature. Then, a film having a thickness of 100 micrometers was produced from the mixture using a twin-screw extruder "KZW15-30MG" (model name) manufactured by Technovel Corporation, in which the cylinder temperature was set so that a temperature gradient of 140° C. to 220° C. was formed, and a T-die. The produced film was cut so as to have a size of 15 cm×15 cm to produce two films for pressing.

A formed article B6 having a length of 15 cm, a width of 15 cm, and a thickness of 1 mm was obtained in the same manner as in Example 8, except that the produced films for pressing, and the produced non-woven fabric (B') to which the polymer (A) adhered were used.

Examples 18 to 21, and Comparative Examples 15 to 19

Formed articles B7 to B15 each having a length of 15 cm, a width of 15 cm, and a thickness of 1 mm were obtained by forming using the same method as in Example 8, except that the component (A) and the component (B') were changed to those listed in Table 5.
<Evaluation Results>

The composition of each example and comparative example, and the evaluation results are listed in Table 5.

TABLE 5

| | | | Example 17 | Example 18 | Example 19 | Example 20 | Example 21 | Comparative Example 15 |
|---|---|---|---|---|---|---|---|---|
| Sizing agent | Polymer (A) | Type | 1-D | 2-D | 5-D | 6-D | 7-D | — |
| | Average particle size of polymer (A) | micrometers | 1.5 | 0.6 | 0.6 | 1.5 | 0.6 | — |
| | Content of polymer (A) | mass % | 7 | 7 | 7 | 7 | 7 | — |
| | Polymer (A) | parts by mass | 2.1 | 1.4 | 1.0 | 2.2 | 1.7 | — |
| Non-woven fabric (B') | Type | | B'-5 | B'-6 | B'-7 | B'-8 | B'-8 | B'-5 |
| | Fiber length (mm) | | 6 | 10 | 40 | 6 | 6 | 6 |
| | Mass per unit area (g/cm³) | | 180 | 130 | 100 | 180 | 180 | 180 |
| | parts by mass | | 111 | 80 | 62 | 111 | 111 | 111 |
| Thermoplastic resin (C) | Type | | PP | PP | PP | PP | PP | PP |
| | parts by mass | | 100 | 100 | 100 | 100 | 100 | 100 |
| Type of formed article | | | B6 | B7 | B8 | B9 | B10 | B11 |
| Volume fraction (%) of reinforcing fibers | | | 33 | 27 | 22 | 33 | 33 | 33 |
| Evaluation results | Flexural strength | MPa | 238 | 197 | 185 | 242 | 244 | 110 |
| | | Quality judgment | Satisfactory | Satisfactory | Satisfactory | Satisfactory | Satisfactory | Unsatisfactory |
| | Falling weight impact strength | J | 13 | 12 | 12 | 14 | 14 | 4 |
| | | Quality judgment | Satisfactory | Satisfactory | Satisfactory | Satisfactory | Satisfactory | Unsatisfactory |
| | External appearance | points | 3 | 3 | 3 | 3 | 3 | 2 |
| | | Quality judgment | Satisfactory | Satisfactory | Satisfactory | Satisfactory | Satisfactory | Rather unsatisfactory |

| | | | Comparative Example 16 | Comparative Example 17 | Comparative Example 18 | Comparative Example 19 |
|---|---|---|---|---|---|---|
| Sizing agent | Polymer (A) | Type | 3-A | 4-B | — | 4-B |
| | Average particle size of polymer (A) | micrometers | 1.2 | 1.3 | — | 1.3 |
| | Content of polymer (A) | mass % | 7 | 7 | — | 7 |
| | Polymer (A) | parts by mass | 1.0 | 1.2 | — | 1.7 |
| Non-woven fabric (B') | Type | | B'-6 | B'-6 | B'-8 | B'-8 |
| | Fiber length (mm) | | 10 | 10 | 6 | 6 |
| | Mass per unit area (g/cm³) | | 130 | 130 | 180 | 180 |
| | parts by mass | | 80 | 80 | 111 | 111 |
| Thermoplastic resin (C) | Type | | PP | PP | PP | PP |
| | parts by mass | | 100 | 100 | 100 | 100 |
| Type of formed article | | | B12 | B13 | B14 | B15 |
| Volume fraction (%) of reinforcing fibers | | | 27 | 27 | 33 | 33 |
| Evaluation results | Flexural strength | MPa | 93 | 98 | 116 | 119 |
| | | Quality judgment | Unsatisfactory | Unsatisfactory | Unsatisfactory | Unsatisfactory |
| | Falling weight impact strength | J | 5 | 5 | 4 | 4 |
| | | Quality judgment | Unsatisfactory | Unsatisfactory | Unsatisfactory | Unsatisfactory |
| | External appearance | points | 1 | 1 | 2 | 1 |
| | | Quality judgment | Unsatisfactory | Unsatisfactory | Rather unsatisfactory | Unsatisfactory |

The detail of the component (C) listed in Table 5 is as follows.

<Thermoplastic Resin (C)>

PP: Polypropylene "NOVATEC MA1B" (trade name) manufactured by Japan Polypropylene Corporation According to Examples 17 to 21, it was found that the flexural strength and the falling weight impact strength, and the external appearance were greatly improved as compared to Comparative Example 15 in which the component (A) was not used. The impregnation of the component (B') with the resin was sufficient, and hence, on the surface of the formed article, there were no irregularities and a gloss was observed.

According to Comparative Examples 15 and 18 in which the component (A) was not used, it was found that the flexural strength, the falling weight impact strength, and the external appearance were inferior to those obtained in the examples.

According to Comparative Examples 16, 17, and 19 in which the component (A) did not include an amino group, it was found that the component (B') and the component (C) were not able to be strongly bonded to each other in the resulting formed article, and the flexural strength and the falling weight impact strength were hardly improved even as compared to those obtained in Comparative Example 15 in which the component (A) was not used. The impregnation of the component (B') with the resin was insufficient, and hence many irregularities were observed on the surface of the formed article.

The invention is not limited to the embodiments described above. Various modifications and variations may be made of the embodiments described above. The invention includes various other configurations that are substantially the same as the configurations described above in connection with the embodiments (such as a configuration having the same function, method, and results, or a configuration having the same objective and results). The invention also includes configurations in which an unsubstantial element or the like described above in connection with the embodiments is replaced by another element or the like. The invention also includes a configuration having the same effects as those of the configurations described above in connection with the embodiments, or a configuration that is capable of achieving the same objective as that of the configurations described above in connection with the embodiments. The invention further includes a configuration in which a known technique is added to the configurations described above in connection with the embodiments.

The invention claimed is:

1. A composition, comprising:
 a polymer (A) including an amino group, which is a conjugated diene-based polymer;
 fibers (B); and
 a thermoplastic resin (C),
 wherein a content ratio of the fibers (B) is 70 parts by mass or more and 250 parts by mass or less based on 100 parts by mass of the thermoplastic resin (C).

2. The composition according to claim 1, wherein a content ratio of the polymer (A) including an amino group is 0.1 parts by mass or more and 10 parts by mass or less based on 100 parts by mass of the thermoplastic resin (C).

3. The composition according to claim 1, wherein the fibers (B) are carbon fibers.

4. The composition according to claim 1, wherein the fibers (B) each have a fiber length of 50 mm or more.

5. A composition, comprising:
 a polymer (A) including an amino group;
 a non-woven fabric (B'); and
 a thermoplastic resin (C).

6. The composition according to claim 5, wherein the non-woven fabric (B') contains recycled fibers.

7. The composition according to claim 5, wherein a content ratio of the non-woven fabric (B') is 50 parts by mass or more and 150 parts by mass or less based on 100 parts by mass of the thermoplastic resin (C).

8. The composition according to claim 5, wherein the non-woven fabric (B') includes carbon fibers.

9. The composition according to claim 5, wherein a content ratio of the polymer (A) including an amino group is 0.1 parts by mass or more and 10 parts by mass or less based on 100 parts by mass of the thermoplastic resin (C).

10. The composition according to claim 5, wherein the thermoplastic resin (C) is an olefin-based resin.

11. A formed article, which is produced using the composition according to claim 1.

12. The composition according to claim 1, wherein the thermoplastic resin (C) is an olefin-based resin.

* * * * *